United States Patent [19]

Kitamura et al.

[11] Patent Number: 5,835,671
[45] Date of Patent: *Nov. 10, 1998

[54] DATA RECORDING MEDIUM HAVING REPRODUCTION TIMING INFORMATION, AND SYSTEM FOR REPRODUCING RECORD DATA BY USING THE REPRODUCTION TIMING INFORMATION

[75] Inventors: Tetsuya Kitamura, Komae; Hideki Mimura, Yokohama, both of Japan

[73] Assignee: Kabushiki Kaisha Toshiba, Kawasaki, Japan

[ * ] Notice: The term of this patent shall not extend beyond the expiration date of Pat. No. 5,703,997.

[21] Appl. No.: 873,807

[22] Filed: Jun. 12, 1997

Related U.S. Application Data

[63] Continuation of Ser. No. 630,763, Apr. 11, 1996, Pat. No. 5,703,997.

[30] Foreign Application Priority Data

Apr. 14, 1995 [JP] Japan ................................. 7-114007

[51] Int. Cl.⁶ ............................. H04N 5/91; H04N 5/928
[52] U.S. Cl. ................................................ 386/97; 386/96
[58] Field of Search ............................. 386/97, 96, 104, 386/66, 54, 75; 360/18; H04N 5/91, 5/928

[56] References Cited

U.S. PATENT DOCUMENTS

| | | |
|---|---|---|
| 4,614,982 | 9/1986 | Ibaraki . |
| 4,680,647 | 7/1987 | Moriyama . |
| 4,870,613 | 9/1989 | Clinkenbeard . |
| 4,989,097 | 1/1991 | Yoshio . |
| 4,992,886 | 2/1991 | Klappert . |
| 5,010,417 | 4/1991 | Yoshio . |
| 5,016,113 | 5/1991 | Yamashita . |
| 5,043,826 | 8/1991 | Yoshio . |
| 5,063,551 | 11/1991 | Yoshio . |
| 5,065,252 | 11/1991 | Yoshio . |
| 5,089,899 | 2/1992 | Nomura . |
| 5,097,349 | 3/1992 | Nomura . |
| 5,107,343 | 4/1992 | Kawai . |
| 5,138,925 | 8/1992 | Koguchi . |

(List continued on next page.)

FOREIGN PATENT DOCUMENTS

| | | |
|---|---|---|
| 0 546 189 A1 | 6/1993 | European Pat. Off. . |
| 0 663 560 A1 | 1/1995 | European Pat. Off. . |
| 0 661 888 A2 | 7/1995 | European Pat. Off. . |
| 0 661 888 A3 | 7/1995 | European Pat. Off. . |
| 4-28056 | 1/1992 | Japan . |
| 4-57275 | 2/1992 | Japan . |
| 4-67470 | 3/1992 | Japan . |
| 4-212768 | 8/1992 | Japan . |
| 4-245090 | 9/1992 | Japan . |
| 4-245091 | 9/1992 | Japan . |
| 5-159468 | 6/1993 | Japan . |
| 6-28780 | 2/1994 | Japan . |
| 8-149407 | 11/1994 | Japan . |
| WO 94/30014 | 12/1994 | WIPO . |

OTHER PUBLICATIONS

Digital Audio and Ancillary Data Sevices for an Advanced Television Service, Advanced Television Systems Committee, Technology Group on Distribution, Doc. T3/186, Feb. 3, 1992.

*Primary Examiner*—Robert Chevalier
*Attorney, Agent, or Firm*—Cushman Darby & Cushman IP Group of Pillsbury Madison & Sutro LLP

[57] ABSTRACT

In a system wherein video data and audio data are reproduced in a non-presentation mode of sub-picture data, control information having an effect process command is transferred to a system CPU before the video data is transferred to a decoder section. After the reproduction of the video data and the audio data selected in association with the video data, e.g. English audio data, is started, sub-picture data, e.g. an English caption, is forcibly presented at a predetermined timing under the effect process command. After a predetermined time period, the presentation of the sub-picture data is disabled by the effect process command.

20 Claims, 17 Drawing Sheets

U.S. PATENT DOCUMENTS

| | | |
|---|---|---|
| 5,233,438 | 8/1993 | Funahashi . |
| 5,237,426 | 8/1993 | Daito . |
| 5,270,828 | 12/1993 | Mogi . |
| 5,274,463 | 12/1993 | Matsumoto . |
| 5,280,572 | 1/1994 | Case . |
| 5,282,186 | 1/1994 | Yoshio . |
| 5,315,400 | 5/1994 | Kurata . |
| 5,336,844 | 8/1994 | Yamauchi . |
| 5,359,582 | 10/1994 | Kim . |
| 5,400,077 | 3/1995 | Cookson . |
| 5,442,456 | 8/1995 | Hansen . |
| 5,497,241 | 3/1996 | Ostrover et al. ............... 358/341 |
| 5,513,010 | 4/1996 | Kori et al. ............... 358/341 |
| 5,574,239 | 11/1996 | Kang et al. ............... 386/97 |
| 5,576,843 | 11/1996 | Cookson et al. ............... 386/97 |
| 5,619,424 | 4/1997 | Cookson et al. ............... 364/514 A |
| 5,646,931 | 7/1997 | Terasaki ............... 386/97 |

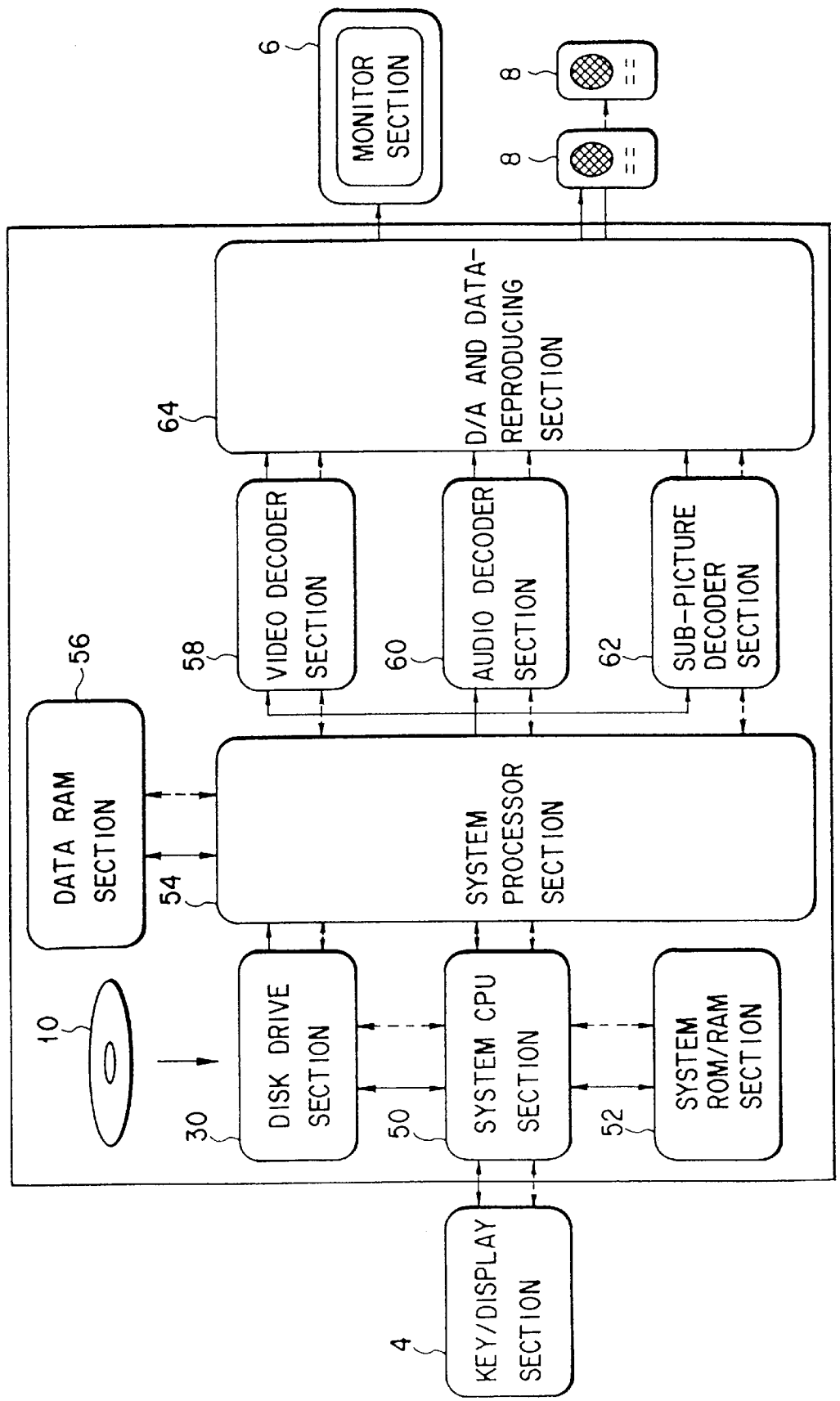
F I G. 1

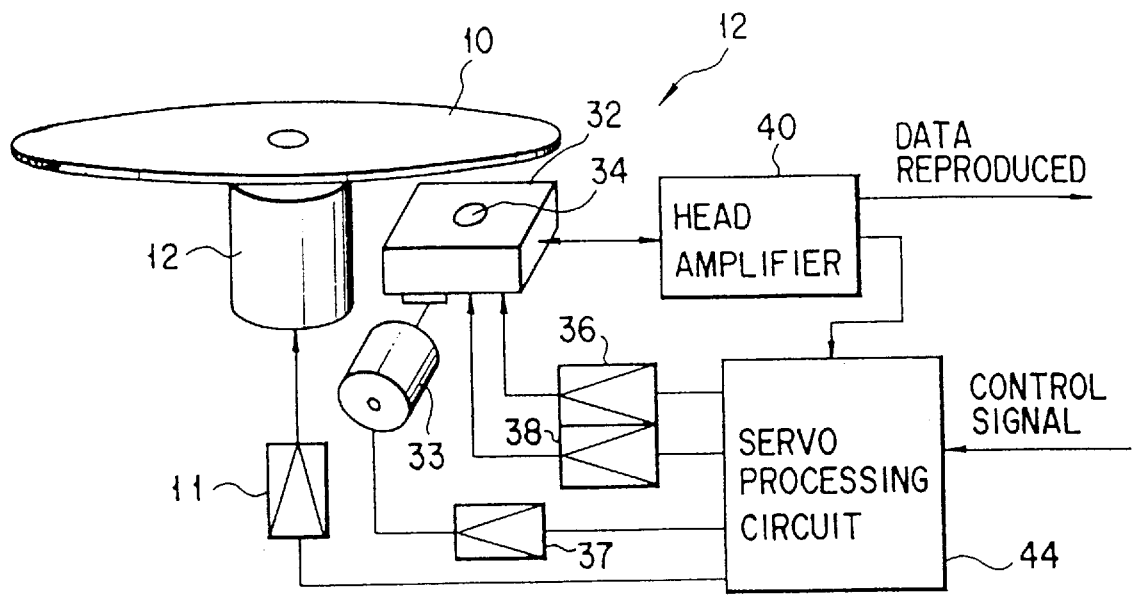
F I G. 2
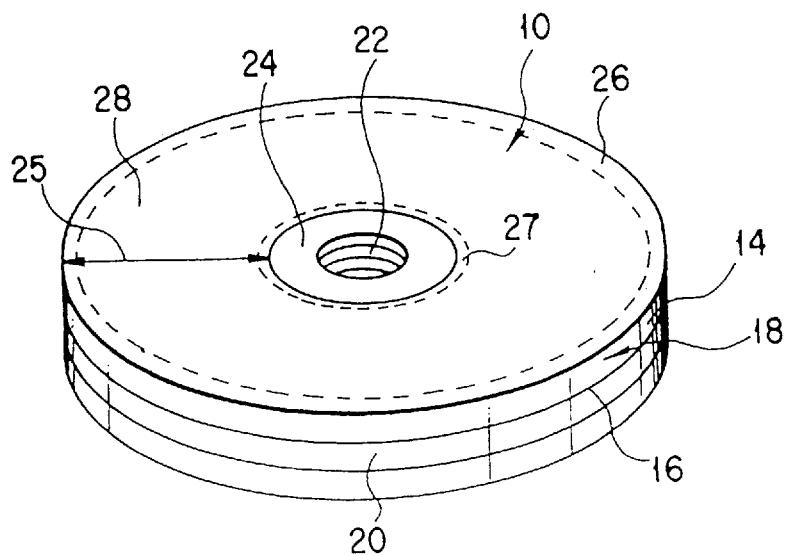
F I G. 3

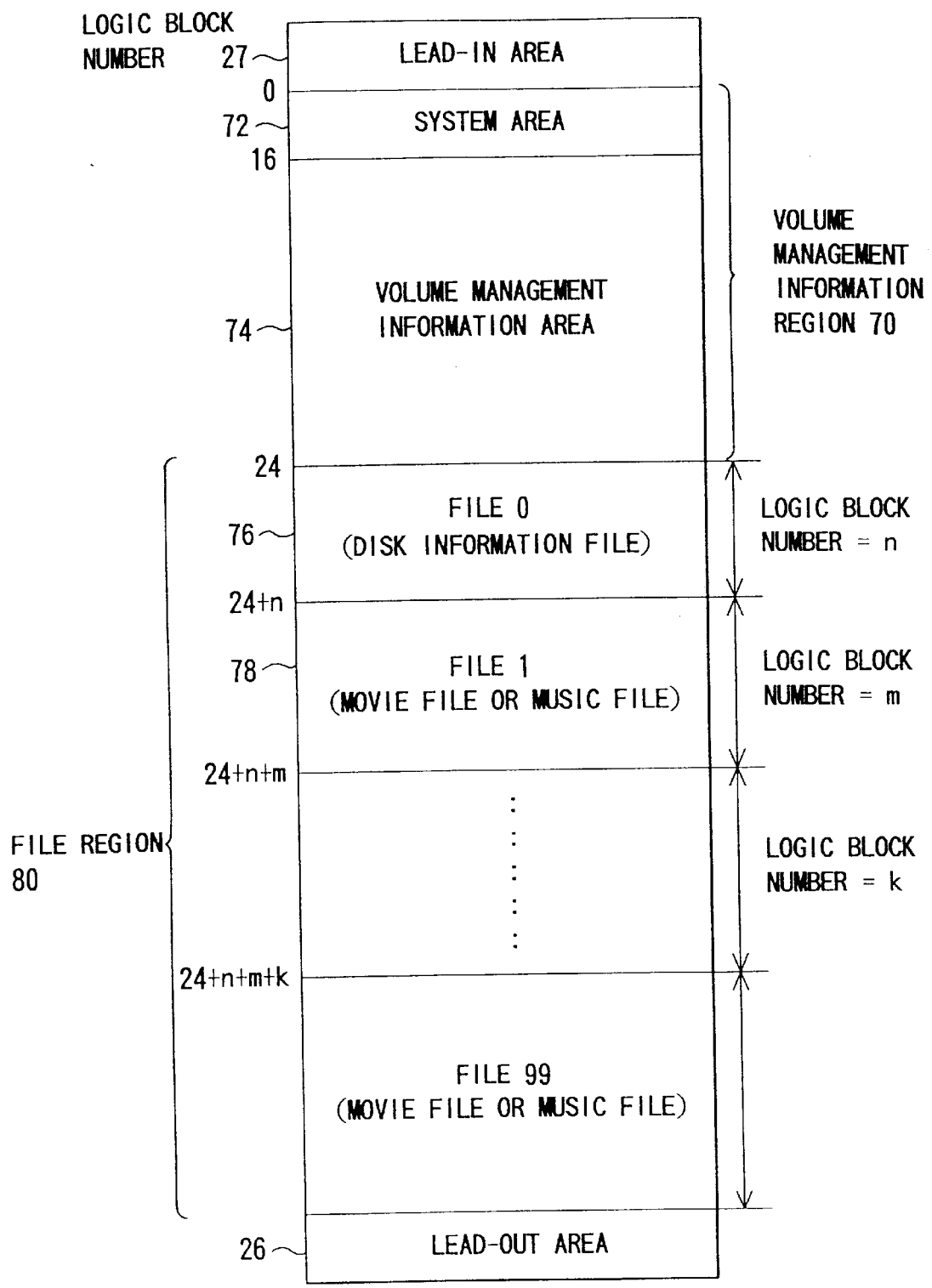
F I G. 4

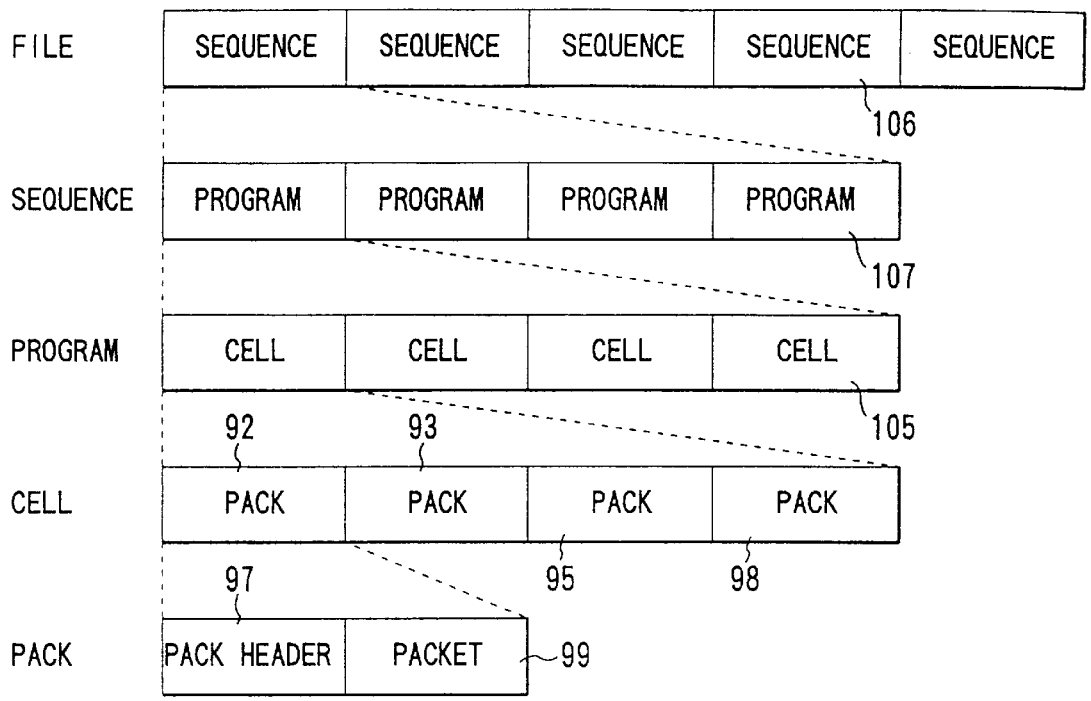
F I G. 7
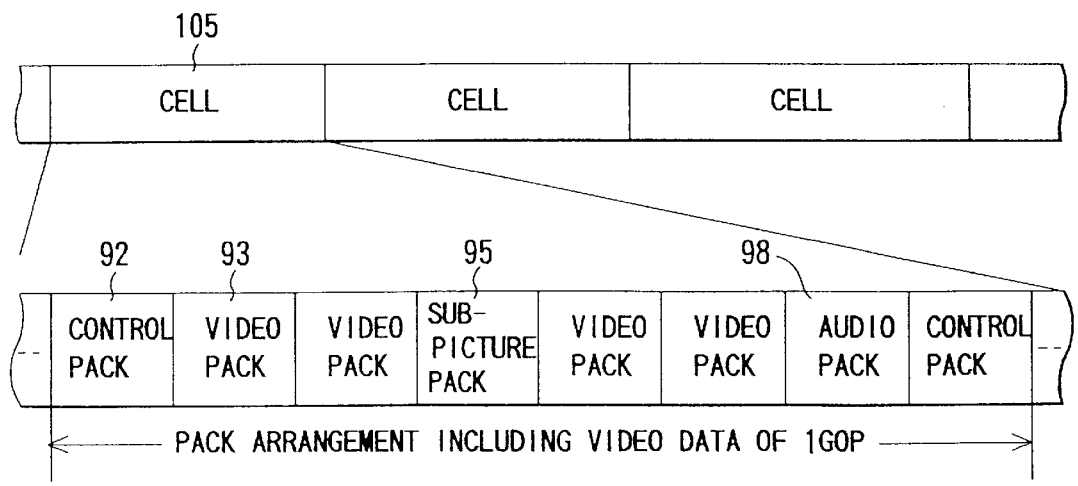
F I G. 8

| DSI | ( DESCRIPTION ORDER ) |
|---|---|
| CONTENTS | NUMBER OF STRUCTURE BYTES |
| GENERAL INFORMATION | 32 BYTES |
| REPRODUCTION SYNC INFORMATION | 544 BYTES |
| DSI PACK ADDRESS INFORMATION | 128 BYTES |
| EFFECT INFORMATION | 128 BYTES |

F I G. 10

| GENERAL INFORMATION | | ( DESCRIPTION ORDER ) |
|---|---|---|
| PARAMETER | CONTENTS | NUMBER OF STRUCTURE BYTES |
| DSCR | SCR OF DSI | 5 BYTES |
| VSPTS | PRESENTATION TIME STAMP OF GOP | 5 BYTES |
| DLBN | LOGIC BLOCK NUMBER OF DSI | 4 BYTES |
| CELN | CELL NUMBER | 2 BYTES |

F I G. 11

| REPRODUCTION SYNC INFORMATION | | ( DESCRIPTION ORDER ) |
|---|---|---|
| PARAMETER | CONTENTS | NUMBER OF STRUCTURE BYTES |
| VPTS | PTS OF INTRA-PICTURE | 5 BYTES |
| VPSA | PACK ADDRESS INCLUDING INTRA-PICTURE | 4 BYTES |
| APTS 0-7 | PTS OF AUDIO DATA | 5 BYTES x 8 |
| APSA 0-7 | ADDRESS OF AUDIO PACK | 4 BYTES x 8 |
| SPPTS 0-31 | PTS OF SUB-PICTURE | 10 BYTES x 32 |
| SPPSA 0-31 | ADDRESS OF SUB-PICTURE AUDIO PACK | 4 BYTES x 32 |

F I G. 12

| b39 | b38 | b37 | b36 | b35 | b34 | b33 | b32 |
|---|---|---|---|---|---|---|---|
| | | | EFTS [32..25] | | | | |
| b31 | b30 | b29 | b28 | b27 | b26 | b25 | b24 |
| | | | EFTS [24..17] | | | | |
| b23 | b22 | b21 | b20 | b19 | b18 | b17 | b16 |
| | | | EFTS [16..9] | | | | |
| b15 | b14 | b13 | b12 | b11 | b10 | b9 | b8 |
| | | | EFTS [8..1] | | | | |
| b7 | b6 | b5 | b4 | b3 | b2 | b1 | b0 |
| | | | PROCESS COMMAND | | | | |

F I G. 13

| EFFECT PROCESS COMMAND | |
|---|---|
| CODE | CONTENT OF PROCESS |
| 0000 0000 | NO PROCESS |
| 0100 XXXX | START FORCIBLE PRESENTATION OF SUB-PICTURE FROM FIRST FRAME AFTER EFTS (XXXX: AUDIO STREAM NUMBER ★) |
| 0101 XXXX | STOP FORCIBLE PRESENTATION OF SUB-PICTURE FROM FIRST FRAME AFTER EFTS (XXXX: AUDIO STREAM NUMBER ★) |

F I G. 14

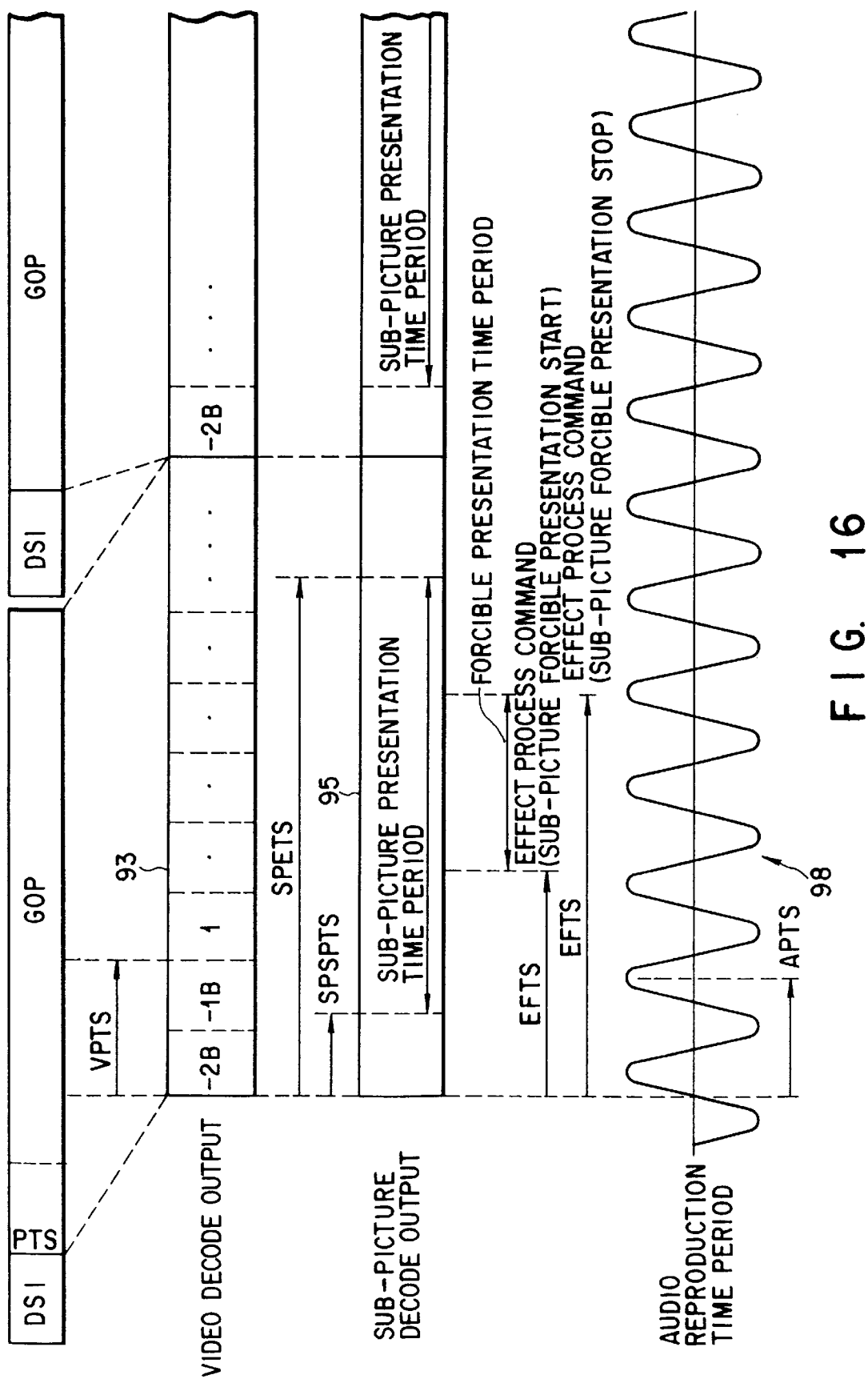
F I G. 16

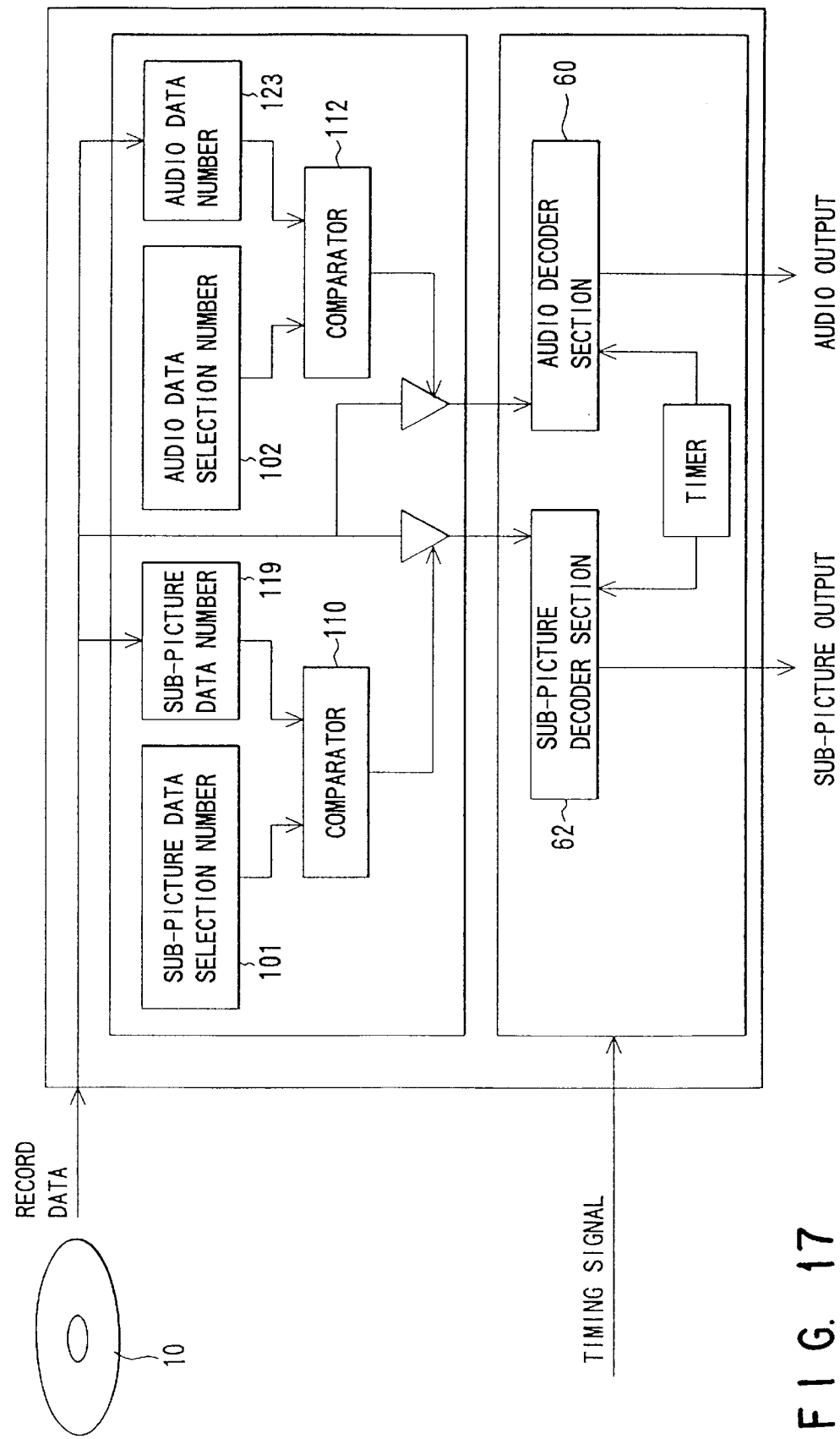
F I G. 17

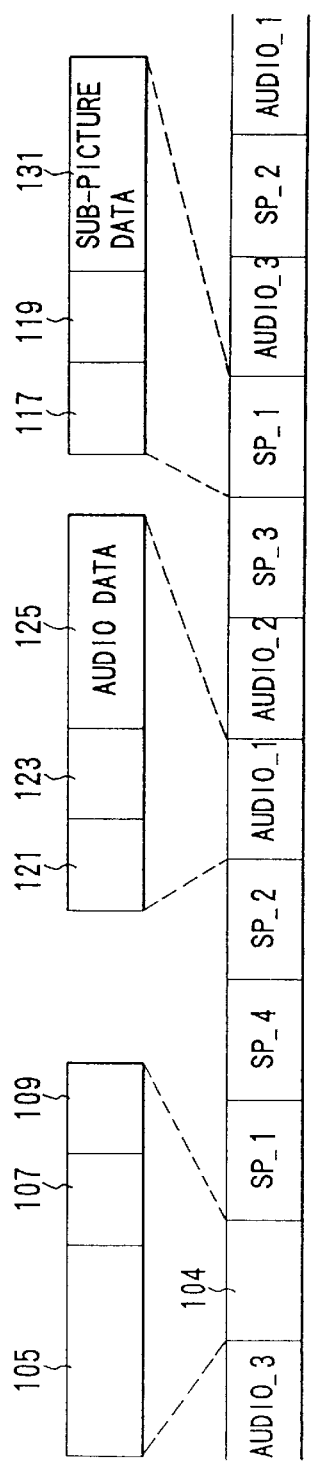
F I G. 18
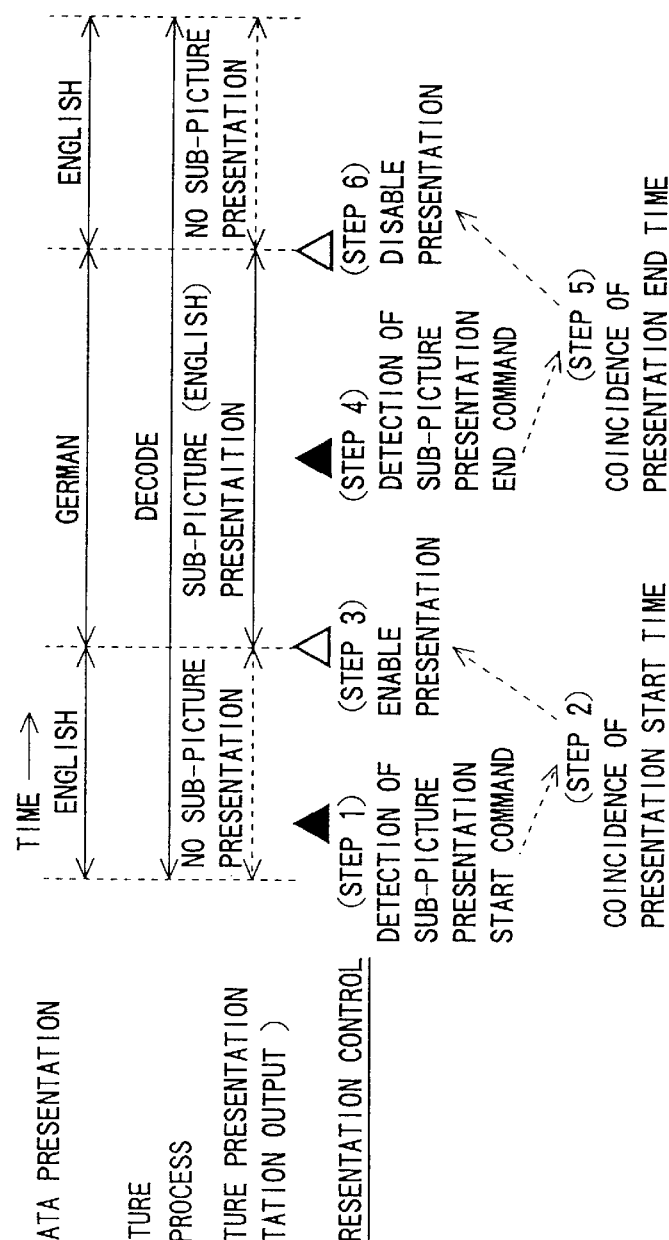
F I G. 19

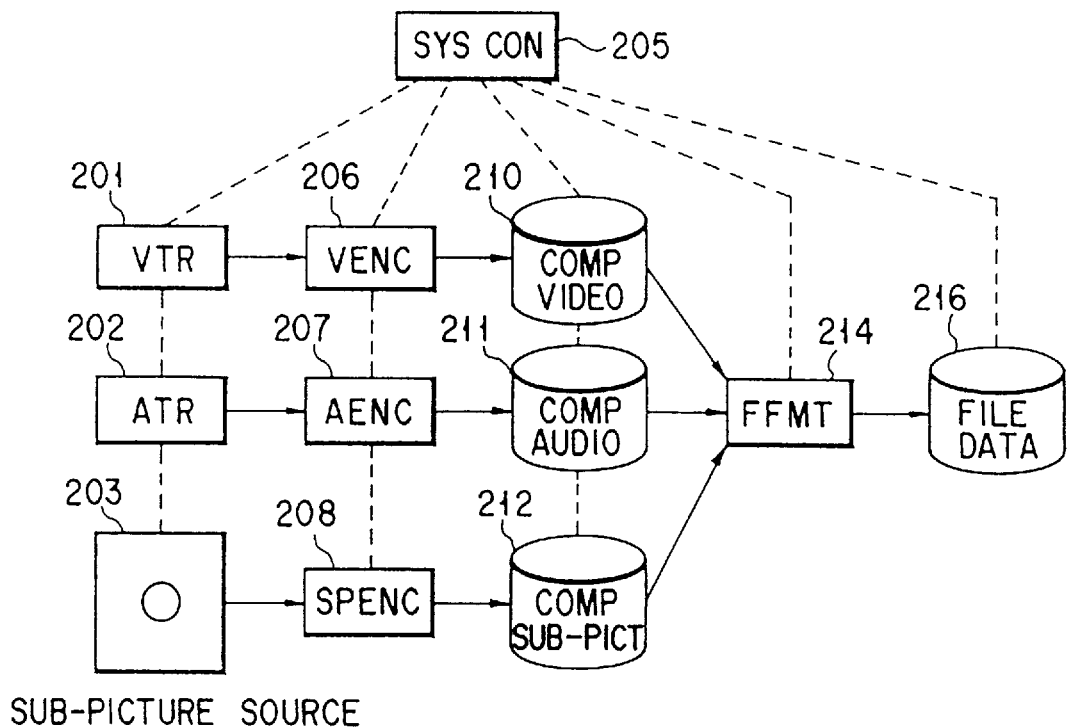
F I G. 20
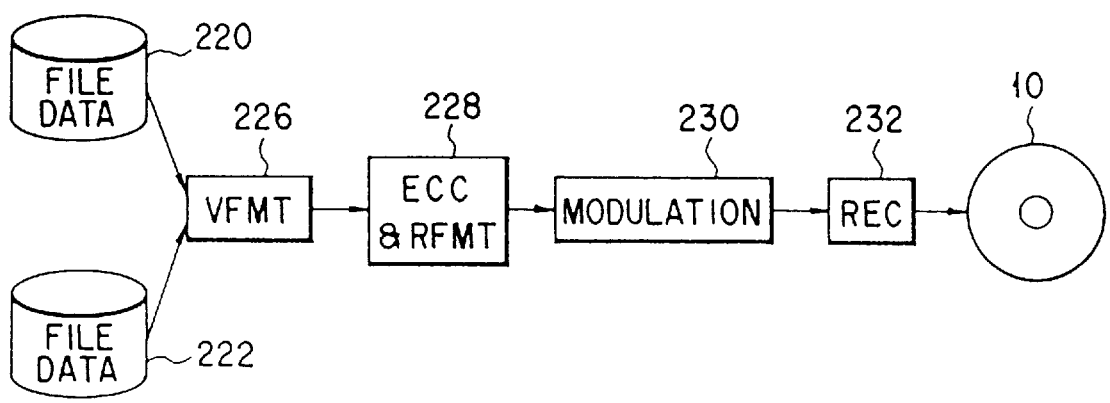
F I G. 23

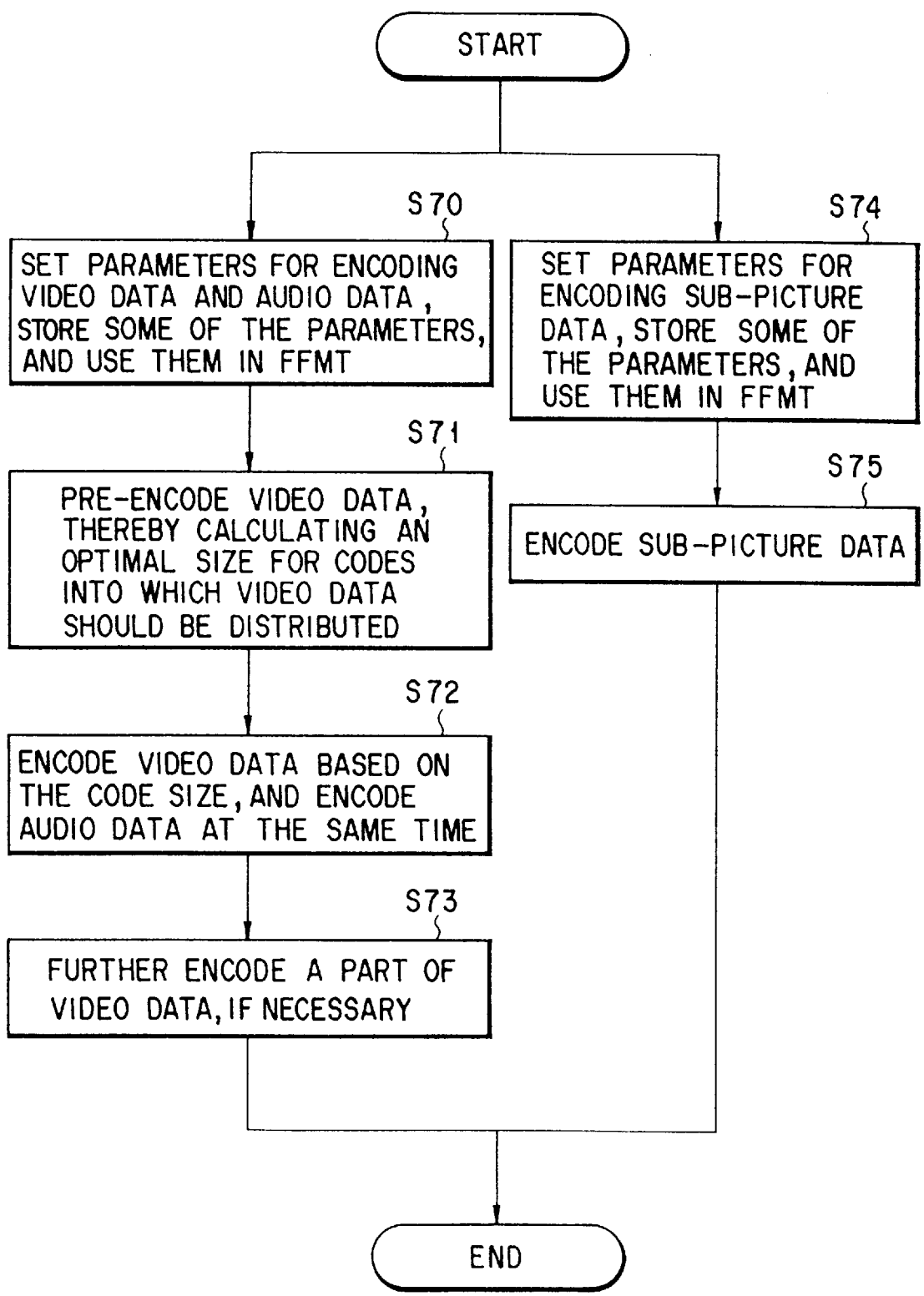
F I G. 21

DATA RECORDING MEDIUM HAVING REPRODUCTION TIMING INFORMATION, AND SYSTEM FOR REPRODUCING RECORD DATA BY USING THE REPRODUCTION TIMING INFORMATION

This is a continuation Application Ser. No. 08/630,763, filed Apr. 11, 1996 now U.S. Pat. No. 5,703,987.

BACKGROUND OF THE INVENTION

1. Field of the Invention

The present invention relates generally to a data recording medium having reproduction timing information, a method of recording data along with reproduction timing information, an apparatus for recording data along with reproduction timing information, a method of reproducing data along with reproduction timing information, and an apparatus for reproducing data along with reproduction timing information, and more particularly, to a data recording method of recording various data, such as digital audio data and sub-picture data on a recording medium, such as an optical disk, a data recording apparatus for recording the data on the recording medium, a recording medium used in these method and apparatus, a data reproducing method of reproducing the data on the recording medium, and a data reproducing apparatus for reproducing the data on the recording medium.

2. Description of the Related Art

Recently, remarkable progress is observed in the development of an optical disk reproducing apparatus adaptable to play back a moving picture. This apparatus performs data reproduction from an optical disk serving as a recording medium on which digital data of pictures, sounds, etc. are recorded at high density by compression, in order to drive a monitor display or a speaker according to the reproduced digital data. It is expected that many software suppliers will release a variety of software represented by movie programs or "karaoke" sing-along programs for use in the above-mentioned apparatus after mass production thereof comes into practice.

Conventionally, video tapes are used as a video recording medium. The video tape does not have a large amount of record capacity per unit area as compared to the optical disk, and do not provide a complicated random access to the recorded data. Therefore, video data is normally recorded along with audio data, and optionally along with a single item of sub-picture data. The audio data and the sub-picture data are selectively reproduced in a conventional reproducing system. When the sub-picture data is selected, the conventional reproducing system simply-reproduces the sub-picture data recorded on the video tape. Because the reproduction state and reproduction time of the sub-picture data are not controlled, the sub-picture presented for each scene cannot be changed, for example.

A video recording medium with an English caption is now prevailing in the U.S. The English caption is recorded on the recording medium in the form of sub-picture data, and selectively turned on and off in a reproducing system of the recording medium. If the English caption is turned off, the reproducing system continuously disables presentation of the English caption, irrespective of conversations represented by audio data otherwise reproduced together with the sub-picture data.

A problem arises in a case where the recording medium has audio data representing not only audio data of English conversations, but also other language conversations. If the English caption is turned off in the reproducing system, no English caption will be presented even when the other language conversations is presented. Specifically, suppose a scene in which the protagonist speaks French on a journey from an English-speaking country to a French-speaking country. Unless an English caption associated with the French conversation is presented, the English-speaking viewers may not understand the French conversation. Similarly, suppose a scene in which the protagonist is viewing the German-language label of a medicine. Unless an English caption associated with the German-language label is presented, the English-speaking viewers may not understand the medicine label.

The aforementioned problem may be solved by preparing an additional English caption associated with the conversations of languages other than English and used when the primary or main English caption is turned off. In this case, however, double recording spaces are required to record sub-picture data of the primary English caption and sub-picture data of the additional English caption, respectively.

SUMMARY OF THE INVENTION

An object of the invention is to provide a data recording medium with which a sub-picture can be presented at a proper timing in accordance with the kind of audio data to be reproduced.

Another object of the invention is to provide a data recording method capable of presenting a sub-picture at a proper timing in accordance with the kind of audio data to be reproduced.

Another object of the invention is to provide a data recording apparatus capable of presenting a sub-picture at a proper timing in accordance with the kind of audio data to be reproduced.

Another object of the invention is to provide a data reproducing method capable of presenting a sub-picture at a proper timing in accordance with the kind of audio data to be reproduced.

Another object of the invention is to provide a data reproducing apparatus capable of presenting a sub-picture at a proper timing in accordance with the kind of audio data to be reproduced.

According to the invention, there is provided a recording medium which comprises video data to be reproduced as a moving picture; first audio data to be reproduced along with the video data; first sub-picture data which can be presented along with the first audio data and can be selectively set in a presentation mode and a non-presentation mode in association with the first audio data; and control information for forcibly presenting the first sub-picture data in a predetermined time slot of a reproduction time sequence during which the first audio data is reproduced, even when the first sub-picture data is set in the non-presentation mode.

According to the invention, there is provided a recording method for a recording medium, which comprises a step of recording video data to be reproduced as a moving picture; a step of recording first audio data to be reproduced along with the video data; a step of recording first sub-picture data which can be presented along with the first audio data and can be selectively set in a presentation mode and a non-presentation mode in association with the first audio data; and a step of recording control information for forcibly presenting the first sub-picture data in a predetermined time slot of a reproduction time sequence during which the first audio data is reproduced, even when the first sub-picture data is set in the non-presentation mode.

According to the invention, there is provided a recording apparatus for a recording medium, which comprises means for recording video data to be reproduced as a moving picture; means for recording first audio data to be reproduced along with the video data; means for recording first sub-picture data which can be presented along with the first audio data and can be selectively set in a presentation mode and a non-presentation mode in association with the first audio data; and means for recording control information for forcibly presenting the first sub-picture data in a predetermined time slot of a reproduction time sequence during which the first audio data is reproduced, even when the first sub-picture data is set in the non-presentation mode.

According to the in the invention, there is provided a reproducing apparatus for a recording medium which comprises video data to be reproduced as a moving picture, first audio data to be reproduced along with the video data, first sub-picture data which can be presented along with the first audio data and can be selectively set in a presentation mode and a non-presentation mode in association with the first audio data, and control information concerning presentation of the first sub-picture data, the apparatus comprising reproducing means for reproducing the video data, the first audio data and the first sub-picture data from the recording medium; selection means for selecting one of the presentation mode and non-presentation mode of the sub-picture data in the reproducing means; and control means for forcibly presenting the first sub-picture data in a predetermined time slot of a reproduction time sequence during which the first audio data is reproduced, even when the first sub-picture data is set in the non-presentation mode by the selection means, on the basis of the control information.

According to the invention, there is provided a reproducing method for a recording medium which comprises video data to be reproduced as a moving picture, first audio data to be reproduced along with the video data, first sub-picture data which can be presented along with the first audio data and can be selectively set in a presentation mode and a non-presentation mode in association with the first audio data, and control information concerning presentation of the first sub-picture data, the apparatus comprising a reproducing step of reproducing the video data, the first audio data and the first sub-picture data from the recording medium; a selecting step of selecting one of the presentation mode and non-presentation mode of the sub-picture data in the reproducing step; and a control step of forcibly presenting the first sub-picture data in a predetermined time slot of a reproduction time sequence during which the first audio data is reproduced, even when the first sub-picture data is set in the non-presentation mode on the basis of the control information in the selecting step.

In the invention, a control command is used for controlling reproduction and presentation of sub-picture data in the state where the sub-picture data is set in a non-presentation mode. The sub-picture data is reproduced and presented in a desired time slot of a reproduction time sequence during which the audio data is reproduced. For example, when the desired time slot is designated to be a period during which the audio data of a non-English conversation is reproduced, the sub-picture data of an associated English caption can be forcibly presented at the designated time slot. In addition, since the above-mentioned forcible presentation control is performed by using the sub-picture data which has been recorded along with the audio data on a recording medium, additional sub-picture data is not required for the non-English conversation. This saves the record capacity of the recording medium.

Accordingly, it is possible to record sets of audio data representing different language conversations and sets of sub-picture data representing associated language captions along with one set of video data on the recording medium. In this case, audio data identification number data is set in a field of the control command to select one of the sub-picture data sets which is associated with the audio data set identified by the number data. The selected sub-picture data set can be subjected to the forcible presentation control when it is confirmed that the identified audio data set coincides with the audio data set which is currently reproduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram schematically showing an optical disk apparatus according to an embodiment of the present invention;

FIG. 2 is a block diagram showing details of the mechanism of a disk drive section shown in FIG. 1;

FIG. 3 is a perspective view schematically showing the structure of an optical disk loaded in the disk drive section shown in FIG. 1;

FIG. 4 is an explanatory view illustrating the structure of a logical format of the optical disk shown in FIG. 3;

FIG. 7 is an explanatory view illustrating the hierarchical structure of a video data area of the file shown in FIG. 6;

FIG. 8 is an explanatory view showing 1 GOP (Group of Pictures) constituting a video cell shown in FIG. 7;

FIG. 10 is an explanatory view showing the contents of disk search information described in the DSI pack shown in FIG. 8;

FIG. 11 is an explanatory view showing parameters described in general information shown in FIG. 10;

FIG. 12 is an explanatory view showing parameters described in reproduction sync information shown in FIG. 10;

FIG. 13 is an explanatory view showing the structure of effect information shown in FIG. 10;

FIG. 14 is an explanatory view showing the contents of an effect process command shown in FIG. 13;

FIG. 16 is an explanatory view illustrating time control information relating, like FIG. 15, to forcible presentation of a sub-picture;

FIG. 17 is a functional block diagram concerning forcible presentation of a sub-picture;

FIG. 18 is an explanatory view illustrating the structure of data relating, like FIG. 17, to forcible presentation of a sub-picture;

FIG. 19 is a time chart relating, like FIG. 18, to forcible presentation of a sub-picture;

FIG. 20 is a block diagram of an encoder system for encoding video data, thereby producing a video file;

FIG. 21 is a flowchart illustrating an encoding process shown in FIG. 20;

FIG. 23 is a block diagram showing a disk formatter system for recording the formatted video file on an optical disk;

DETAILED DESCRIPTION OF THE PREFERRED EMBODIMENT

Figure 5:
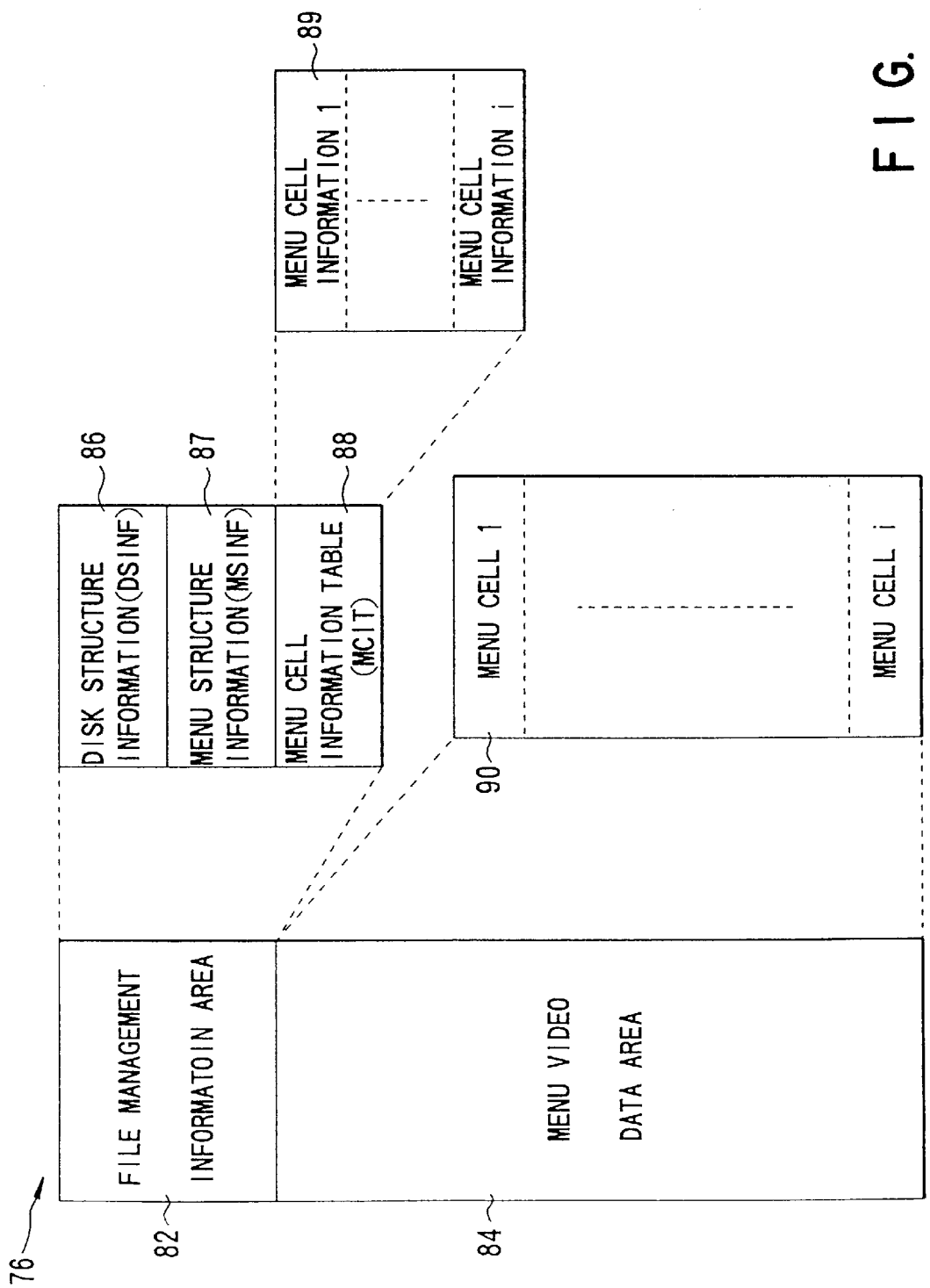
FIG. 5 is an explanatory view illustrating the structure of a disk information file shown in FIG. 4.

Hereinafter, referring to the accompanying drawings, an optical disk reproducing apparatus according to an embodiment of the present invention will be explained.

FIG. 1 is a block diagram of an optical disk reproducing apparatus that reproduces data from an optical disk associated with an embodiment of the present invention. FIG. 2 is a block diagram of a disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the record data to be reproduced from an optical disk 10. The record data contains video (or movie) data, sub-picture data, and audio data, which are converted into video signals and audio signals. The monitor section 6 displays images according to the audio signals and the speaker section 8 generates sound according to the audio signals.

It is known that the optical disk 10 has various structures. For instance, one kind of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. Clamping areas 24 are provided at the periphery of the center hole 22 on both sides, which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues to be clamped at the clamping areas 24.

As shown in FIG. 3, the optical disk 10 has an information zone 25 around the clamping zone 24 on each side. The information zones allow the information to be recorded on the optical disk 10. In each information area 25, its outer circumference area is a lead-out area 26 in which no information is normally recorded, its inner circumference area adjoining the clamping area 24 is a lead-in area 27 in which no information is normally recorded, and the area between the lead-out area 26 and the lead-in area 27 is a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which reproduction data, video data, sub-picture data, and audio data are recorded in the form of pits (that is, in the form of changes in the physical state), as will be explained later. With the read-only optical disk 10, a train of pits is formed in advance in the transparent substrate 14 by a stamper, a reflecting layer is formed by deposition on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 56, a video decoder section 58, an audio decoder section 60, a sub-picture decoder section 62, and a D/A and data reproducing section 64.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and rotated by the spindle motor 12. The optical head 32 that projects a laser beam on the optical disk 10 is located under the optical disk 10. The optical head 32 is placed on a guide mechanism (not shown). The feed motor driving circuit 37 supplies a driving signal to the feed motor 33. The motor 33 is driven by the driving signal and moves the optical head 32 across the radius of the optical disk 10. The optical head 32 is provided with an objective lens 34 positioned so as to face the optical disk 10. The objective lens 34 moves according to the driving signal supplied from the focus circuit 36 so as to move along its optical axis.

To reproduce the data from the above optical disk 10, the optical head 32 projects a laser beam on the optical disk 10 via the objective lens 34. The objective lens 34 is moved little by little across the radius of the optical disk 10 according to the driving signal supplied from the tracking circuit 38. Furthermore, the objective lens 34 is moved along its optical axis according to the driving signal supplied from the focusing circuit 36 so that its focal point is positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, the objective lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track, for example, at a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in the data RAM section 56 by the system processor section 54 which is controlled by the system CPU section 50 operating in accordance with the programs stored in the system ROM/RAM section 52. The stored reproduced data is processed at the system processor section 54, which sorts the data into video data, audio data, and sub-picture data, which are then supplied to the video decoder section 58, audio decoder section 60, and sub-picture decoder section 62, respectively, and are decoded at the respective decoder sections. The D/A and data-reproducing section 64 converts the decoded video data, audio data, and sub-picture data into an analog video signal and an analog audio signal, and supplies the resulting video signal to the monitor 6 and the resulting audio signal to the speaker 8. Then, on the basis of the video signal and sup-picture signal, images are displayed on the monitor section 6 and according to the audio signal, sound is simultaneously reproduced at the speaker section 8.

The structure of the logic format according to the initial version of the optical disk apparatus shown in FIG. 1 will now be described with reference to FIGS. 4 to 11. The operation of the optical disk apparatus shown in FIG. 1 will be described in greater detail along with the logic format of the optical disk 10.

FIG. 4 shows the structure of the logic format according to an initial version thereof. Specifically, a data recording region 28 beginning with the lead-in area 27 and ending with the lead-out area 26 on the optical disk 10 shown in FIG. 1 has a volume structure, as shown in FIG. 4, conforming to a logic format of ISO9660. This volume structure comprises a hierarchical volume management information region 70 and a hierarchical file region 80. The volume management information region 70 corresponds to logic block numbers 0 to 23 defined according to ISO9660. A system area 72 and a volume management area 74 are assigned to the volume management information region 70. The system area 72 is normally an empty area and the contents thereof are not defined. For example, the system area 72 is provided for an editor for editing data to be recorded on the optical disk 10 or a person who provides a title. A system program for operating the optical disk apparatus according to the editor's intention is stored in the system area 72 on an as-needed basis. The volume management area 74 stores volume management information for managing a disk information file 76 in the file region 80 (hereinafter referred to simply as "disk information file 76") and a file 78, such as a movie file or a music file, i.e. data on the record positions, record capacities, file names, etc. of all files. Files 76 and 78 of file numbers 0 to 99 designated by logic block numbers beginning with 24 are provided in the file region 80. The file 76 with file number 0 is assigned as disk information file 76. The files 78 with file numbers from 1 to 99 are assigned as movie or video files or music files.

As is shown in FIG. 5, the disk information file 76 comprises a file management information area 82 and a menu video data area 84. The file management information area 82 stores file management information for selecting a selectable sequence, such as a video title or an audio title, recorded on the entire optical disk 10. The menu video data area 84 stores, in the form of menu cells 90, menu video data for displaying menus of selecting a title, etc. As will be described later in detail, the menu video data of the menu video data area 84 is divided into units of a size necessary for a purpose, i.e., an i-number of menu cells 90 sequentially numbered from #1 in the order in which the cells 90 are recorded on the menu video data area 84 on the disk 10. The menu cells 90 have video data, sub-picture data or audio data concerning the selection of a movie title or an audio title, selection of programs for each title, etc.

As shown in FIG. 5, the file management information area 82 comprises three information areas: a disk structure information area 86 for storing a disk structure information (DSINF), a menu structure information area 87 for storing menu structure information (MSINF), and a cell information table (MCIT) 88 for storing cell information. These three information areas are arranged in that order.

The disk structure information area 86 principally stores disk structure information, such as the number (expressed as parameter DSINF between numerals 1 and 99) of movie files and music files, i.e., reproduction files 78, recorded in the file region 80 of the disk 10, the number of sequences (sets of video data, audio data and sub-picture data) being present within each file 78, i.e. the number of titles (expressed as parameter FSINF), and sub-picture and audio information in each file. When the file 78 is, for example, a movie file, it is specified in the disk structure information that the file 78 is the movie file. When there is a number of audio streams, the number of audio streams, for example, two, and codes specifying that the audio streams are, for example, English-language and Japanese-language audio streams, are included in the disk structure information. In addition, the number of sub-picture channels and codes specifying that the sub-picture channels are, for example, English-language and Japanese-language captions (or subtitles), are included in the disk structure information.

The menu structure information area 87 stores menu structure information such as the total number (i.e. parameter NOMCEL) of menu cells 90 present in the menu video data area 84 of the disk information file 76, a start cell number (i.e. parameter TMSCEL) assigned to an initial one of the menu cells 90 which are used to display a title menu, a start cell number specifying the initial one of menu cells 90 which are used to display an audio menu, a start cell number specifying the initial one of menu cells 90 which are used to display a sub-picture menu, and a start cell number specifying the initial one of menu cells 90 which are used to display a program menu.

The menu cell information table 88 is defined as an aggregation of an i-number of cell information areas 89 which are provided in the order of cell numbers and have cell information necessary for reproduction of the menu cells 90. If no video data for displaying a menu is present in the file 76, the menu information table is not provided. The cell information table 88 has information concerning the position (i.e. parameter MCSLBN indicated by an offset logic block number from the beginning of the file) of the menu cell 90 in the file 76, the size (i.e. parameter MCNLB indicated by the number of logic blocks), etc.

On the basis of the menu cell information and menu structure information (MSINF), each menu cell is selected to display a menu. When one of the selection items is selected on the displayed menu, a code of disk structure information is specified. For example, an audio stream No. #1 of an English speech is designated without a sub-picture of an English caption, or an audio stream No. #2 is designated with a sub-picture of a Japanese caption. The disk structure information (DSINF) and menu structure information (MSINF) are successively provided in the file management information area 82. The menu cell information table (MCIT) 88 is provided at a boundary of logic blocks.

Figure 6:
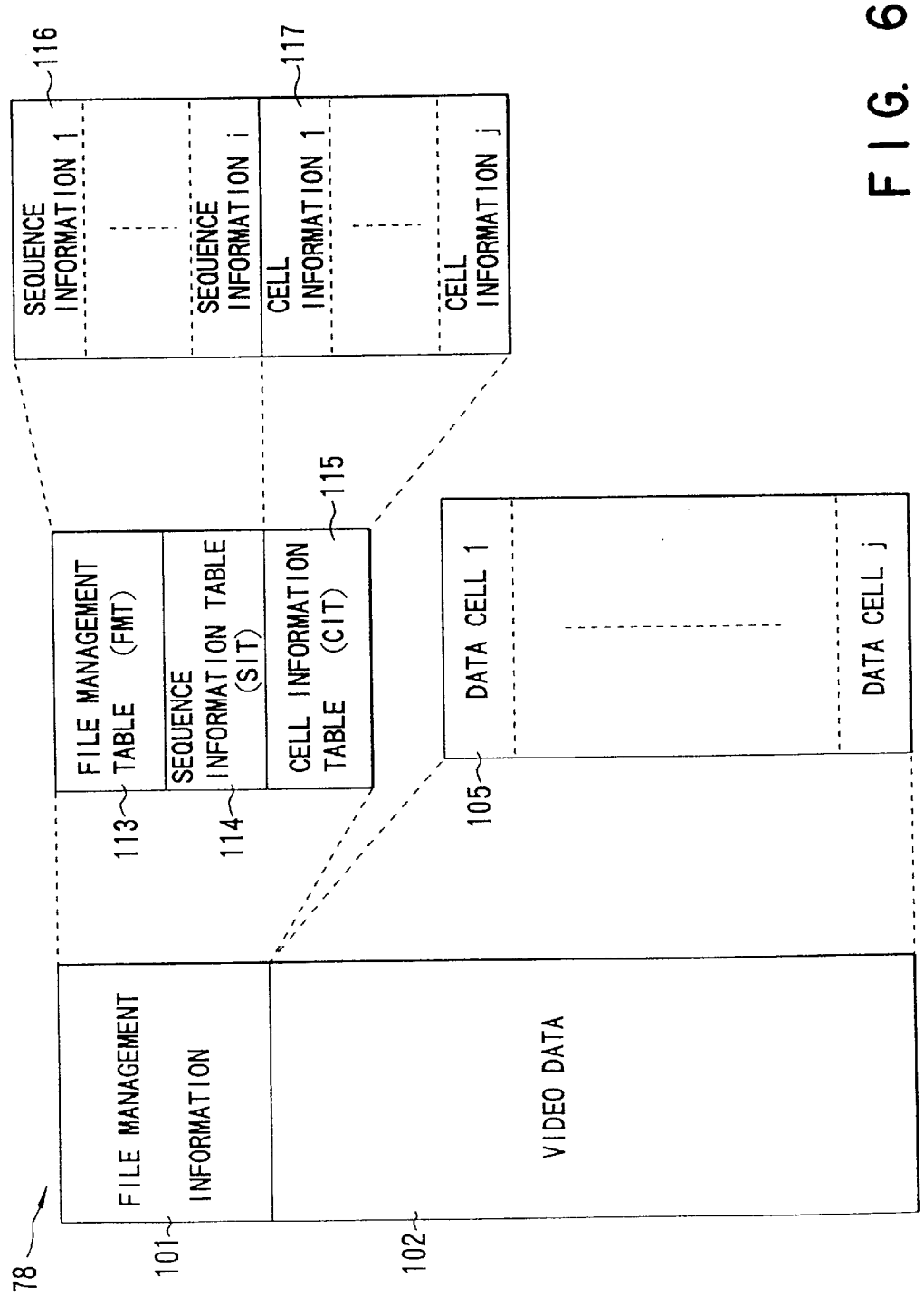
FIG. 6 is an explanatory view illustrating the structure of a file, such as a movie file or a music file, as shown in FIG. 4.
Figure 9A:
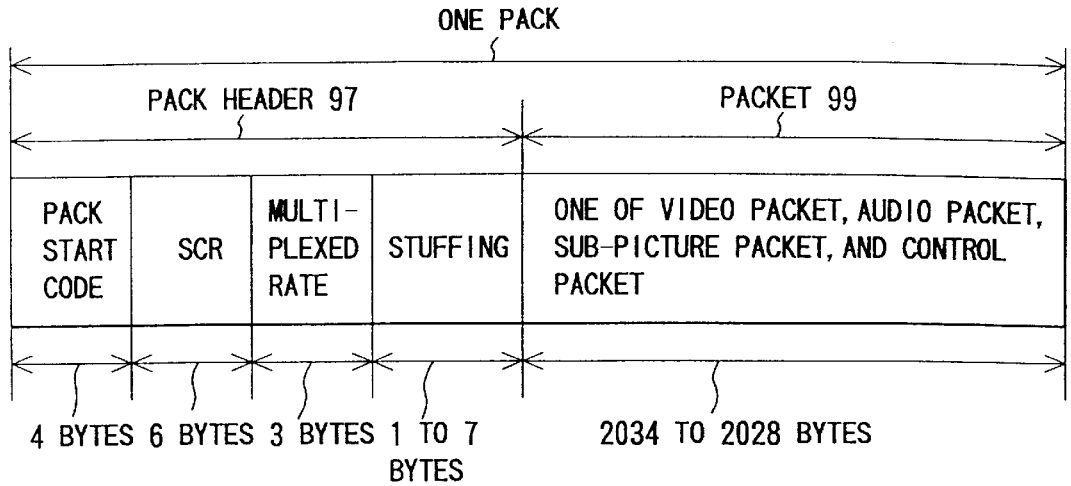
FIGS. 9A and 9B are explanatory views showing the structure of a pack shown in FIG. 8.
Figure 9B:
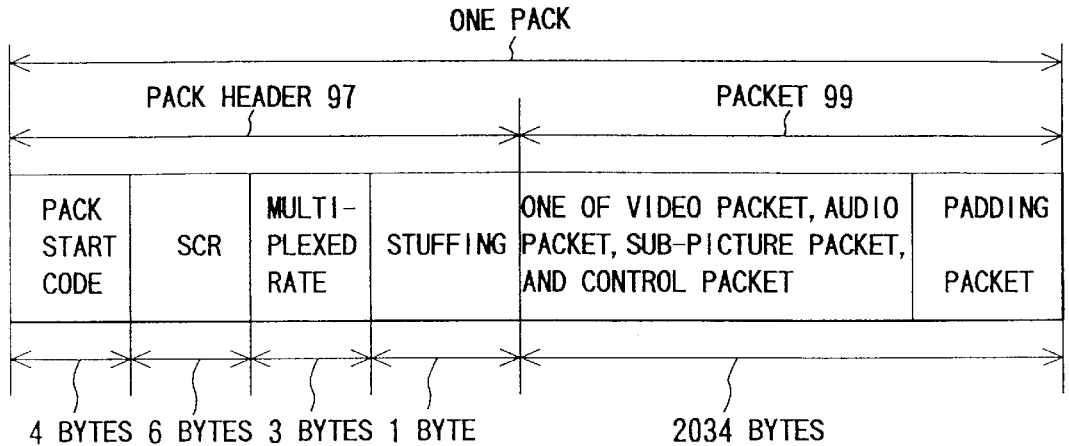

Music data or movie data of one or more titles is stored in the movie files or music files 78 corresponding to file numbers 1 to 99, as shown in FIG. 4. Each file 78 has a file structure, as shown in FIG. 6, comprising file management information area 101 storing information on the data contained in the file 78, i.e. management information (e.g. address information, reproduction control information, etc.), and a video data area 102 storing moving video data (including video data, audio data and sub-picture data) in the file 78. The video data area 102 stores moving video data in the form of video data cells 105, like the menu cells 90 of the disk information file 76, and the moving video data is divided into a j-number of video data cells 105.

In general, movie data or audio data of a certain title is expressed as an aggregation of successive sequences 106. For example, the story of a movie is expressed by successive sequences 106 corresponding to "introduction," "development," "turn," and "conclusion." Accordingly, the video data area 102 of each file 78 is defined as an aggregation of sequences 106, as shown in FIG. 7. Each sequence 106 is expressed by a plurality of video programs 107 corresponding to various scenes of the story. Each video program 107 is composed of a plurality of video data cells 105. Each video data cell 105 as shown in FIG. 8, comprises a plurality of groups of pictures (GOP) in each of which a disk search information (DSI) pack 92, a video pack 93, a sub-picture pack 95 and an audio pack 98 are combined. The structure of the video cell 105 is substantially the same as that of the menu cell 90. The video data 102 consists of movie data, audio data, sub-picture data, etc., which have been compressed according to a compression standard of, e.g. MPEG1 (Moving Picture Expert Group) or MPEG2 and recorded in a data format corresponding to a system layer of MPEG2. Specifically, the video data 102 is a stream of programs defined by the MPEG standard. Further, each of the packs 92, 93, 95 and 98 has a pack structure formed of a pack header 97 and a packet 99 corresponding to the pack. More specifically, there are two types of packs 92: a pack 92N shown in FIG. 9A in which a padding packet is not inserted, and a pack 92P shown in FIG. 9B in which a padding packet is inserted in order to adjust the length of the pack to 2048 bytes (one logic sector). Normally, adjustment is made by adding a stuffing byte to the pack header 97 when the number of data items to be adjusted is 7 bytes or less, and by adding a padding packet when the number of data items to be adjusted is 8 bytes or more.

In each pack, a pack start code, a system clock reference (SCR) value, a multiplexed rate and a stuffing is provided as the pack header 97; and a video packet, an audio packet, a sub-picture packet, a disk search pack such as a DSI packet are provided according to the kind of the pack as the packet 99 successive to the packet 97. As will be described in greater detail, the SCR value is referred to by the system CPU section 50 as a time based on which an absolute time of a timer provided within the optical disk apparatus, i.e. a system time clock (STR), is referred to, thereby executing transfer of data packets, etc.

A video data decoding time stamp (DTS) for expanding MPG-compressed video data at the aforementioned time and a presentation time stamp (PTS) for outputting the decoded video data from the decoder section at the aforementioned time are provided in the packet 99 of the first video pack within one GOP. The decoding time stamp DTS is compared with the system time clocks in the decoder sections 58, 60 and 62 and the packet 99 is decoded by decoder sections 58, 60, and 62. The presentation time stamp PTS is compared with the system time clock within the D/A and data reproducing section 64 and decoded and the decoded data is subjected to a reproducing process in the D/A and data reproducing section 64.

The file management information area 101 comprises a file management table (FMT) 113, a sequence information table (SIT) 114, a cell information table (CIT) 115 and a disk search map (DSM).

The video data cells in the video data area 102 shown in FIG. 6 are assigned sequential numbers from #1 in the order of record on the disk, and the cell numbers and cell information associated with the cell numbers are provided on the cell information table 115. Specifically, the cell information table 115 is defined as an aggregation of areas 117 storing a j-number of cell information (CI) items which are necessary for reproduction of the video data cells and arranged in the order of the cell numbers. The cell information (CI) includes information concerning the position, size, reproduction time, etc. of the cell within the file 78.

The sequence information table 114 is defined as an aggregation of areas 116 for storing an i-number of sequence information (SI) items representing, for example, the order of selecting and reproducing the cells 105 in a range designated for each sequence 106. Each sequence information (SI) item contains reproduction control information concerning the reproducing order and the reproduction of video cells 105 recorded in the sequence 106.

The sequences 106 are classified into two types: a completion-type sequence which is completed by a single sequence, and a connection-type sequence which is branched and connected to the next sequence. Connection-type sequences include: a connection-type head sequence which is a head sequence of video data corresponding to a multi-story and can be branched and connected to the next sequence, i.e. a connection-type head sequence in which the story varies according to the manner of choice of the story; a connection-type intermediate sequence which is a branch of another connection-type sequence and is connected to still another sequence; and a connection-type end sequence which is connected to another connection-type sequence and is completed, i.e. a connection-type end sequence with which the story is completed. Sequence numbers 1 to i are assigned to these sequence information items. The start point information of each sequence information item is written on the file management information table 113.

The file management table (FMT) 113 shows various information concerning the video file 78. The file management table 113 stores the name of the file and an identifier for determining whether or not the file can be reproduced by the optical disk reproducing apparatus in which the optical disk is mounted. The file identifier has, for example, an identifier for identifying a movie file. The file management table 113 also stores the start addresses of the sequence information table 114 and cell information table 115, the number of sequence information items and the number of cell information items stored in these tables, the start address of each sequence indicated by an offset logic block from the start of the sequence information table 114, the start address of the video data in the video data area 102, and data attributes serving as information required for reproducing each data.

As has been described with reference to FIG. 8, the disk search information pack (DSI pack) 92 is included in a top portion of the 1GOP of video data. In the disk search information pack (DSI pack) 92, as shown in FIG. 10, various information items concerning reproduction of the 1GOP are stored. Specifically, the DSI pack 92 contains general information shown in FIG. 11, reproduction sync information of 1GOP shown in FIG. 12, position information of the DSI, i.e. address information, and effect information concerning various effects occurring in a reproduction time period of 1GOP, such as effect commands which will be described with reference to FIGS. 13 and 14.

In the effect information of the disk search information pack (DSI pack) 92, process commands as shown in FIGS. 13 and 14 and the start time and end time of the process commands-shown in FIG. 13 serving as offset presentation time stamps (EFTS) for the effects, are described. The EFTS is defined as offset time from an absolute time represented by the video start presentation time stamp VSPTS contained in the reproduction sync information. The start time is [(VSPTS/90000)+(description value/45000)] sec. The process commands include a command for forcibly starting presentation of a sub-picture from the start time of a specific audio stream, i.e. from the first frame after the EFTS, and a command for forcibly stopping presentation of a sub-picture from the end time of a specific audio stream, i.e. from the first frame after the EFTS.

Specifically, when a specific audio stream, e.g. an English audio stream of audio stream No. #1, is selected, commands for executing and ending special reproduction (EFTS) are described. The special reproduction is required, for example, when a scene in which a protagonist is speaking English has been switched to a scene in which he speaks French with a French-speaking person. In this case, special effect (EFTS) is executed at the time the English conversation has been switched to the French conversation after the start of a certain audio stream, and an English caption is forcibly presented as sub-picture. The special reproduction is also required,- for example, when an English-speaking protagonist takes a medicine in a drugstore and views the label of the medicine. In this case, an English caption is forcibly presented as sub-picture to indicate the name of the medicine. The commands for the special reproduction process include a command for causing no effect process to be executed.

In FIG. 14, the effect process command is shown as a sub-picture presentation control command formed of five bytes. The upper four bytes are assigned to a field for designating the time for executing the sub-picture presentation control command. Upper four bits of the fifth byte from the upper most byte are assigned to a field for designating forcible start (represented by "0100") or forcible stop (represented by "0101") of presentation by the sub-picture presentation control command. Lower four bits of the fifth byte from the upper most byte are assigned to a field for designating the kind (language No.) of audio data to execute the command only during reproduction of the designated audio data. In this case, one selected from 16 kinds of audio data can be designated for reproduction. A selection number for designating all kinds of audio data (represented by "0000") is also provided. When all kinds of audio data have been designated, a sub-picture is forcibly presented even if any of audio streams is reproduced.

As is shown in FIG. 11, in the general information, a system clock reference (SCR) value which should be referred to by the disk search information pack (DSI pack) 92 is described as parameter DSCR, and a presentation time stamp (PTS) rep resenting timing for reproducing the 1GOP is described as parameter VSPTS. Thus, when the system time clock (STC) of the apparatus coincides with the system clock reference (SCR) value described in the pack header 97 of the disk search information pack (DSI pack) 92, the packet 99 of the DSI pack 92 is transferred to the system CPU section 50. At this time, the pack header 97 of the DSI pack 92 is separated from the packet 99 to transfer the packet 99 alone to the system CPU section 50. The parameter DSCR represents the time, at which the packet 99 of the DSI pack 92 has been transferred, and is referred whenever necessary. The timing for reproducing 1GOP (1 Group of Pictures) is specified by the time stamp (VSPTS). The general information also includes a logic block number (DLBN) of the DSI pack and a cell number (CELN).

In the reproduction sync information, a presentation time stamp (PTS: parameter VPTS) representing the time for reproducing an intra-picture (I-picture) from the MPEG-compressed video packs 93 is described as an offset PTS from VSPTS. In addition, in the reproduction sync information, an address (parameter VPSA) of the video pack 93 including the I-picture is described as an offset logic block number from the DSI pack. A presentation time stamp PTS (parameter APTS) for reproducing audio data from audio packs is described as an offset PTS from VSPTS. The parameter APTS is a PTS of an audio packet having a closest reproduction start time after the reproduction start time of the I-picture. The description area is prepared for 8 streams corresponding to audio stream numbers #1 to #8. Furthermore, in the reproduction sync information, an address (parameter APSA 0–7) of the audio pack 98 specified by the APTS is described as an offset logic block from the DSI pack. In the reproduction sync information, a presentation time stamp PTS (parameter SPPTS 0–31) of a sub-picture unit comprising sub-picture packs 93 reproduced in the GOP reproduction time period is described as an offset PTS from VSPTS. The description area for this is prepared for 32 streams associated with sub-picture stream numbers #1 to #32. Besides, in the reproduction sync information, an address (parameter APSA 0–31) of the sub-picture audio pack 98 specified by the SPPTS is described as an offset logic block from the DSI pack.

Referring back to FIG. 1, the operation for reproducing movie data from the optical disk 10 having the logic format shown in FIGS. 4 to 6 will now be described. In FIG. 1, solid-line arrows between the blocks indicate data buses, and broken-line arrows indicate control buses.

In the optical disk apparatus shown in FIG. 1, when power is supplied, the system CPU section 50 reads out an initial operation program from the system ROM/RAM section 52 and activates the disk drive section 30. The disk drive section 30 starts a read-out operation from the lead-in area 27 and reads out volume management information from the volume management information area 74 of the volume management information region 70 following the lead-in area 27. Specifically, the system CPU section 50 delivers a read command to the disk drive section 30 in order to read out the volume management information from the volume management information area 74 recorded on a predetermined position on the disk 10 set in the disk drive section 30. Thus, the system CPU section 50 reads out the volume management information and temporarily stores the read-out information in the data RAM section 56 via the system processor section 54. The system CPU section 50 extracts, from the volume management information data sequence stored in the data RAM section 56, necessary management information such as the record position of each file, the record capacity, etc. The extracted information is transferred and saved in a predetermined location in the system ROM/RAM section 52.

The system CPU section 5t refers to the previously obtained information on the record position of each file, the record capacity, etc. in the system ROM/RAM section 52, and obtains the disk information file 76 corresponding to the file number 0. Specifically, the system CPU section 50 refers to the previously obtained information on the record position of each file, the record capacity, etc. in the system ROM/RAM section 52, delivers a read command to the disk drive section 30, reads out file management information of the disk information file 76 with the file number 0, and stores the read-out information in the data RAM section 56 via the system processor section 54. Similarly, the obtained information is transferred and saved in a predetermined location in the system ROM/RAM section 52.

The system CPU section 50 makes use of the disk structure information 86, menu structure information 87 and menu cell information table 88 of the file management information in the disk information file 76 and reproduces and presents on the screen the sequence (title) selection menu cell of the menu video data 84. The user selects a sequence (title) to be reproduced, audio data of the title and sub-picture of the title by the key/display section 4 on the basis of the selection numbers displayed on the menu screen. Thereby, the file number, sequence information and audio stream belonging to the selected sequence are specified. The audio stream to be selected is, for example, an English audio stream corresponding to audio stream #1, a Japanese audio stream corresponding to audio stream #2, etc. The sub-picture to be selected is, for example, an English caption or a Japanese caption. When audio data of a movie story is English, no sub-picture is normally presented unless an English caption is selected by the sub-picture selection, except for the case where a sub-picture is presented by special reproduction, as will be described later.

The operation until the designated video file 78 is acquired and the video data 102 is reproduced will now be described. In order to acquire the sequence information associated with the designated sequence number, the information on the record position and record capacity of each video file 78 is obtained from the volume management information 74 and is used. At first, the file management information 101 of the video file 78 belonging to the sequencer to be reproduced is read out, as in the case of the disk information file 76, and stored in the data RAM section 56.

The system CPU section 50 obtains the sequence information corresponding to the designated sequence number from the sequence information table 114 of the file management information 101 stored in the data RAM section 56. The obtained data and the cell information 117 in the cell information table 115 necessary for reproducing the sequence are transferred and stored in the system ROM/RAM section 52.

The cell information on the cell which is to be first reproduced is obtained from cell reproduction order information in the thus acquired sequence information. On the basis of the video data reproduction start address and size data in the cell information, a read command for reading from a target address is delivered to the disk drive section 30. The disk drive section 30 drives the optical disk 10 according to the read command and reads the data of the target address from the optical disk 10. The read-out data is sent to the system processor section 54. The system processor section 54 temporarily stores the sent data in the data RAM section 56 and determines the kind of data (video, audio, sub-picture, reproduction information, etc.) on the basis of header information added to the stored data. The data is transferred to the decoder section 58, 60 or 62 associated with the kind of the data.

Each decoder section 58, 60, 62 decodes the data according to the data format and sends the decoded data to the D/A and data reproducing section 64. The D/A and data reproducing section 64 converts the decoded digital signal to an analog signal and subjects the analog signal to a mixing process. The resultant signal is output to the monitor section 6 and speaker section 8.

In the process of determining the kind of data, if data is reproduction information representing the reproduction position of video data, etc., the reproduction data is not transferred and is stored in the data RAM section 56. The reproduction information is referred to by the system CPU section 50 on an as-needed basis and is used for monitoring in video data reproduction.

A description will now be given of the case where the menu cell has been acquired and the menu screen has been displayed and the user has selected an English audio stream corresponding to audio stream #1 as audio data of a title and selected no sub-picture of the title.

If the title is selected, the file 78 corresponding to the title is stored in the RAM 56. From the stored file 78, the file management information 101 of the file 78 is transferred to the system ROM/RAM section 52. Based on the transferred information 101, the data cells 105 are read out successively. As has been described above, the data cell 105 is an aggregation of GOPs (Groups of Pictures). Thus, the data cell 105 is transferred from the data RAM 56 to the system processor section 54 in units of GOP, and the video data, audio data and sub-picture data are transferred to the associated,-decoder-sections 58, 60 and 62.

Figure 15:
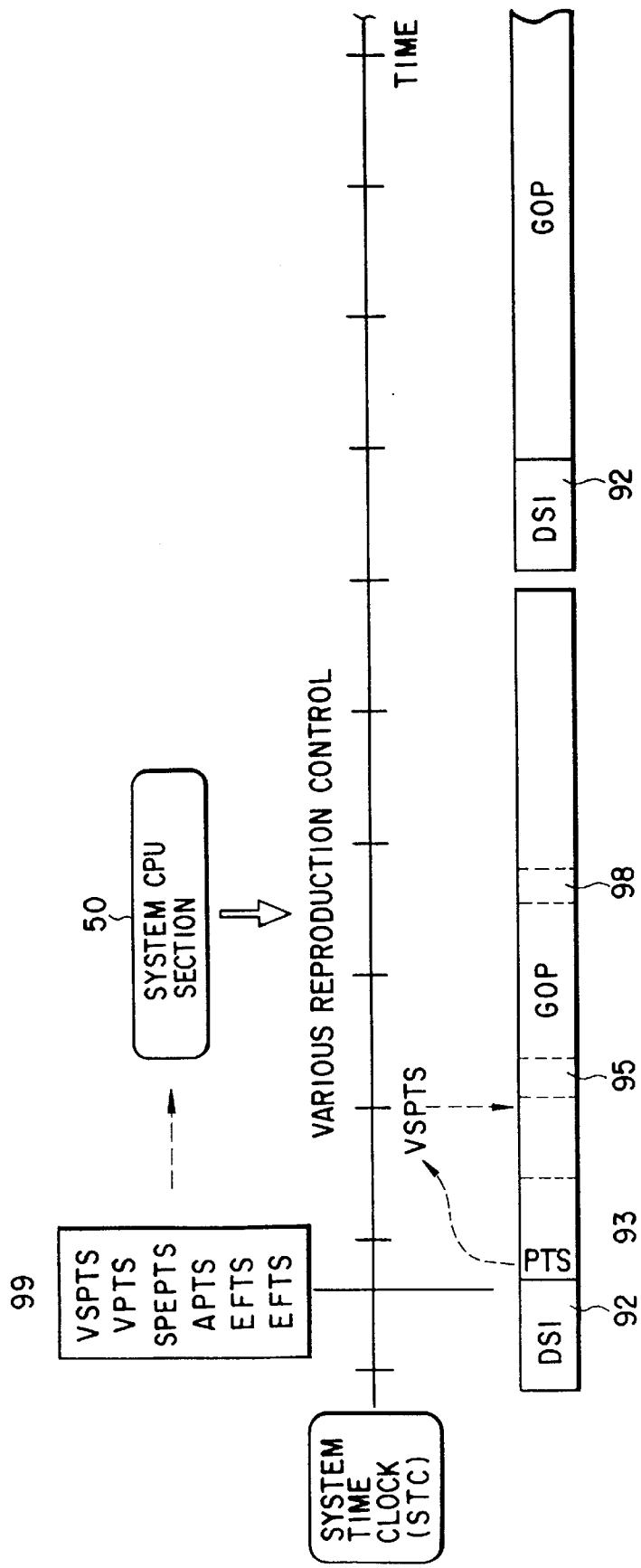
FIG. 15 is an explanatory view illustrating time control information concerning forcible presentation of a sub-picture.

At first, the disk search information pack (DSI pack) 92 at the top of the GOP is read out from the data RAM 56 on the basis of the file management information 101. In the pack header 97 of the disk search information pack (DSI pack) 92, the system clock reference (SCR) value is described as general information. If the time represented by the parameter SCR coincides with the system time clock STC representing the reference time of the system CPU 50, etc., the packet 99 of the DSI pack 92 is transferred to the system CPU 50, as shown in FIG. 15. Specifically, as shown in FIG. 15, the contents of the packet 99, i.e. the reproduction timing stamp (VSPTS) of the GOP, I-picture PTS (VPTS), sub-picture PTS (SPSPTS) corresponding to the start time of sub-picture PTS (SPPTS), sub-picture PTS (SPEPTS) corresponding to the stop time of sub-picture PTS (SPPTS), audio PTS (APTS), effect process command, the start time of the effect process command (EFT), and the stop time (EFT) of the effect process command, are transferred to the system CPU 50. Thus, the system CPU 50 manages the transfer/reproduction of the video packs 93, sub-picture pack 95 and audio pack 98 following the DSI pack 92 from the data RAM 56 to the decoder sections 58, 60 and 62 via the system processor section 54. Specifically, if the system clock reference (SCR) of each pack 92 coincides with the system time clock (STC) of the apparatus in the system CPU 50, i.e. if it is determined that the presentation time stamp (VSPTS) coincides with the SCR described in the pack header of the video packet 93, the packet 99 of the video pack 93 is transferred from the data RAM 56 to the decoder section 58 via the system processor section 54. Similarly, following the video pack 93, the packets 99 of the video pack 95 and audio pack 98 are transferred from the data RAM 56 to the associated decoder sections 60 and 62 via the system processor section 54.

Furthermore, if the decoding time stamp (DTS) described in the packet header of the video pack 93 coincides with the system time clock (STC), the system CPU 50 enables the decoder section 58 to expand, i.e. unpack, the picture, B-picture, etc. in the MPEG-compressed packet 99 of the video pack 93. In addition, the system CPU 50 lets the decoder section 58 output the expanded video data to the monitor 6 via the D/A and data reproducing section 64 at the time point of the I-picture PTS (VPTS) described as offset time from the presentation time stamp (VSPTS), as shown in FIG. 16.

Similarly, if the decoding time stamp (DTS) described in the pack header of the video pack 93 coincides with the system time clock (STC), the system CPU 50 enables the decoder section 60 to expand, i.e. unpack, the audio data, etc. in the compressed packet 99 of the audio pack 98. In addition, the system CPU 50 lets the decoder section 60 output the expanded video data to the speaker 8 via the D/A and data reproducing section 64 at the time point of the audio PTS (APTS) described as offset time from the presentation time stamp (VSPTS), as shown in FIG. 16. By the output of the video data and audio data, the monitor 6 displays a moving picture and the speaker 8 outputs audio sound and background sound accompanying the moving picture. Since the English audio stream is selected, as mentioned above, a sub-picture is not presented on the monitor 6 in the normal movie reproduction.

Similarly, the system CPU 50 enables the decoder section 62 to expand, i.e. unpack, the sub-picture data, etc. in the compressed packet 99 of the sub-picture pack 95 between the sub-picture PTS time (SPSPTS) described as offset time from the presentation time stamp (VSPTS) and the sub-picture PTS time (SPEPTS), as shown in FIG. 16. Since the English stream is selected as audio stream, however, the sub-picture is not output to the monitor 6 from the D/A and data reproducing section 64 and the English caption is not presented. In the case of a scene displayed on the monitor 6 in which the protagonist switches English conversation to French conversation, the system CPU 50 manages the switching time of conversion as time for the special effect (EFT), as described above. Accordingly, the output from the D/A and data reproducing section 64 to the monitor 6 is released from the forcible presentation time (EFTS) of special presentation PTS for starting special effect (EFT), which is described as offset time from the presentation time stamp (VSPTS). Thus, the monitor 6 presents the English caption in the scene of French conversation. When the protagonist switches the French conversation to the English conversation, the system CPU 50 similarly manages the switching time of conversion as time for the special effect (EFT). Specifically, the output from the D/A and data reproducing section 64 to the monitor 6 is stopped from the forcible presentation time (EFTS) of special presentation PTS for stopping special effect (EFT), which is described as offset time from the presentation time stamp (VSPTS). Thus, the monitor 6 stops the forcible presentation of the English caption. As is clear from FIG. 16, when the English stream is selected as audio stream, the forcible presentation time period is limited to a portion of the sub-picture presentation time period. Apart from the switching of the language of conversation, if there is a scene in which an English-speaking protagonist holds a medicine in a drugstore and views the German-language label on the medicine, an English sub-picture corresponding to the German-language label can be temporarily presented similarly.

The concept of the forcible sub-picture presentation based on the special effect (EFT) will now be briefly described once again with reference to the functional blocks shown in FIGS. 17 to 19. As already described, the streams of audio data and sub-picture data with the presentation timing information (parameters VSPTS, VPTS, SPETS, APTS, EFTS, etc.) shown in FIG. 17 are reproduced from the optical disk 10 as packs 95 and 98. Record data shown in FIG. 17 includes three audio data streams (Audio-1, Audio-2, Audio-3) and sub-picture data streams (SP-1, SP-2, SP-3) associated with the audio data streams, as shown in FIG. 18. For example, the sub-picture data streams contain a Japanese caption, a German caption and a French caption. An additional sub-picture data stream (SP-4) is recorded as, e.g. an English caption. In addition, a sub-picture presentation control command 104 is recorded on the optical disk 10. The sub-picture presentation control command 104 precedes the sub-picture data stream (SP-1) and audio data stream (Audio-1) which are reproduced at time (1) and is executed at time (1) corresponding to EFT. The sub-picture presentation control command 104 includes a presentation control time 105, an audio data number 107 and a presentation control kind 109. The audio data stream (Audio-1) includes an audio data presentation timing 121, an audio data number 123 and audio data 125. The sub-picture data stream (SP-1) includes a sub-picture data presentation timing 117, a sub-picture data number 119 and sub-picture data 131.

In the reproducing apparatus, the audio data selection number 101 and sub-picture data selection number 102 are set on the menu, and supplied to functioning blocks serving as comparators 110 and 112 which compare the selection numbers 101 and 102 with the data numbers 123 and 119, respectively. The reproducing apparatus reads an audio data stream whose audio data number 119 coincides with the audio data selection number 101 and a sub-picture data stream whose sub-picture number data 119 coincides with the sub-picture selection number 101, and reproduces the data streams at the reproduction time indicated therein.

FIG. 19 is a timing chart showing the relationship between the output of the reproducing apparatus and the presentation control. In the example represented by this timing chart, sub-picture presentation is stopped while the audio data in which German is mixed in English is being reproduced. Until the sub-picture presentation control command has been read, the reproducing apparatus cannot determine at what time a sub-picture should be forcibly presented. Even if decoding is started after the presentation start time is determined, presentation of a sub-picture may not be effected in time. Thus, when the sub-picture presentation is stopped, the decoding process of the sub-picture data of the same kind as audio data is always performed (step 1). At the presentation start time designated by the sub-picture presentation control command (step 2), the sub-picture presentation output is enabled (step 3) and the sub-picture forcible presentation is achieved. Similarly, the sub-picture presentation is forcibly stopped at the presentation end time designated by the sub-picture presentation control command (steps 4 and 5) by disabling the sub-picture presentation output (step 6).

With reference to FIGS. 20 to 25, a description will now be given of the video data with the format shown in FIGS. 4 to 13, a method of recording the video data on the optical disk 10 to be reproduced, and a recording system to which the recording method is applied.

FIG. 20 shows an encoder system for generating a video file by encoding video data. In the system shown in FIG. 20, sources of video data, audio data and sub-picture data are, for example, a video tape recorder (VTR) 201, an audio tape recorder (ATR) 202 and a sub-picture source 203. These sources generates video data, audio data and sub-picture data under control of a system controller (SYS CON) 205. These data items are supplied to a video encoder (VENC) 206, an audio encoder (AENC) 207 and a sub-picture encoder (SPENC) 208. Under control of the system controller (SYS CON) 205, these data items are A/D converted by the encoders 206, 207 and 208 and encoded by respective compression methods. The encoded video data, audio data and sub-picture data (COMP VIDEO, COMP AUDIO, COMP SUB-PICT) are stored in memories 210, 211 and 212. The video data, audio data and sub-picture data (COMP VIDEO, COMP AUDIO, COMP SUB-PICT) are output to a file formatter (FFMT) 214 by the system controller (SYS CON) 205 and converted to the video data file structure of the above-described system. The information on the setting condition, attributes, etc. of each data item is stored as a file in a memory 216 by the system controller (SYS CON) 205.

A standard control flow of an encoding process in the system controller (SYS CON) 205 for preparing a file from video data will now be described.

According to the flow illustrated in FIG. 21, the video data and audio data are encoded and the encoded video data and audio data (COMP VIDEO, COMP AUDIO) are produced. Specifically, when the encoding process is started, necessary parameters for encoding the video data and audio data are set (step S70 in FIG. 21). Some of the set parameters are saved in the system controller (SYS CON) 205 and used in the file formatter (FFMT) 214. In step S71, the parameters are used to pre-encode the video data and calculate an optimal code amount distribution. In step S72, based on the code amount distribution obtained by the pre-encoding, the video data is encoded. At this time, the audio data is also encoded. In step S73, if necessary, the video data is partially re-encoded and the re-encoded video data is substituted. Through the series of steps, the video data and audio data are encoded. In steps S74 and S75, the sub-picture data is encoded and encoded sub-picture data (COMP SUB-PICT) is produced. Specifically, when the sub-picture data is encoded, necessary parameters are similarly set. In step S74, some of the set parameters are saved in the system controller (SYS CON) 205 and used in the file formatter (FFMT) 214. Based on the parameters, the sub-picture data is encoded. By this process the sub-picture data is encoded.

Figure 22:
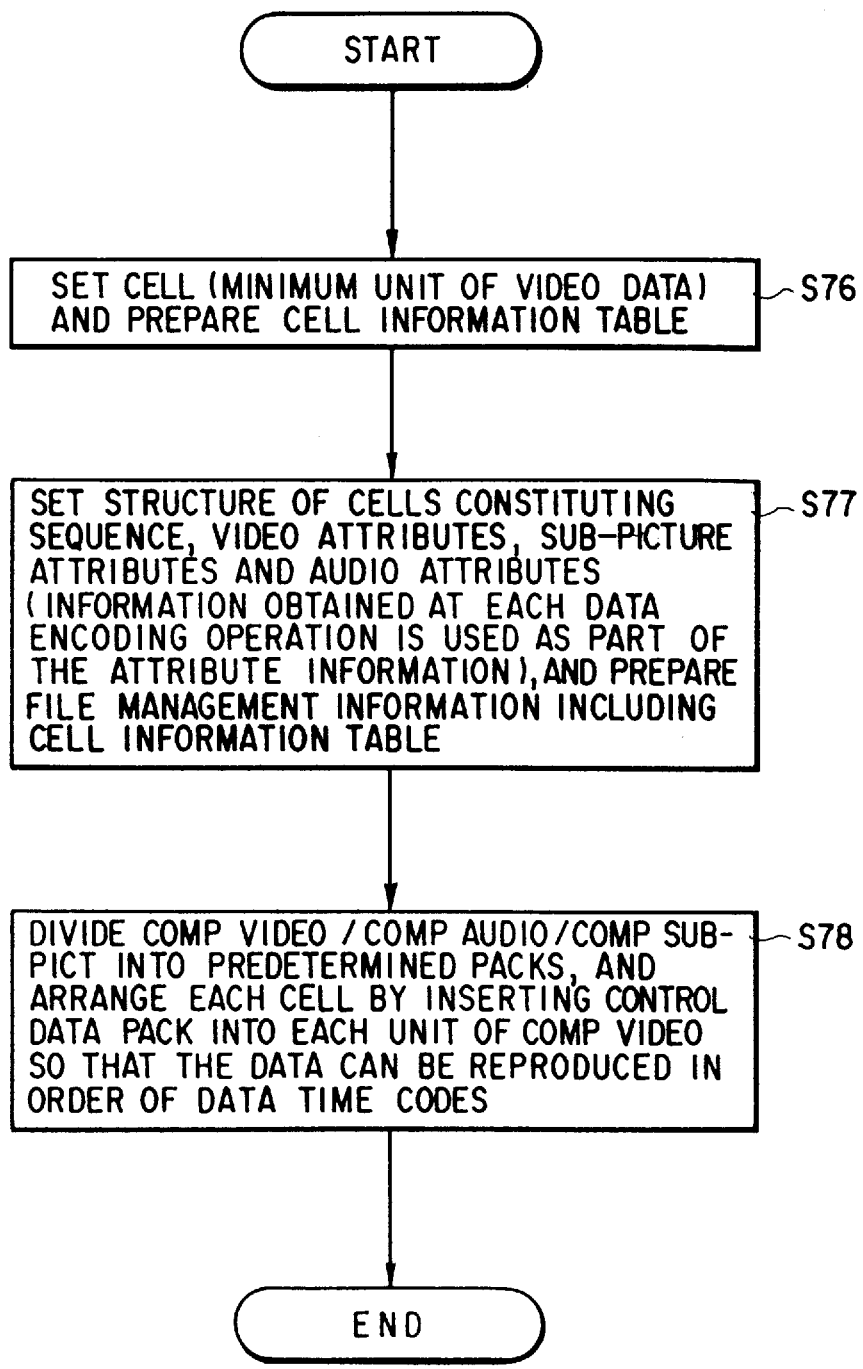
FIG. 22 is a flowchart illustrating a process of producing a video data file by combining audio data, sub-picture data, and video data encoded in the encoding process of FIG. 21.

According to the flow illustrated in FIG. 22, the encoded video data, audio data and sub-picture data (COMP VIDEO, COMP AUDIO, COMP SUB-PICT) are combined and converted to a video data file structure as described with reference to FIG. 6. Specifically, in step S76, the cell 105 is set as minimum stream of video data and the cell information table (CIT) 115 is produced. Then, in step S77, the structure of cells 105 constituting the sequence. 106, video attributes, sub-picture attributes and audio attributes are set (information obtained at each data encoding operation is used as part of the attribute information). The file management information (FMI) including the cell information table (CIT) 115 is prepared. The encoded video data, audio data and sub-picture data (COMP VIDEO, COMP AUDIO, COMP SUB-PICT) are divided into predetermined packs. Each data cell is arranged by inserting the control pack (DSI) 92 into each 1GOP so that the data can be reproduced in the order of data time codes. Thus, as shown in FIGS. 5 and 6, the data is formatted in the structures of the disk information file 76 and the files 78 such as movie files.

FIG. 23 shows a disk formatter system for recording the above-described formatted files 76 and 78 on the optical disk. As shown in FIG. 23, in this disk formatter system, file data is supplied to a volume formatter (VFMT) 226 from memories 220 and 222 storing the prepared information file 76 and files 78 such as movie files. In the volume formatter (VFMT) 226, the disk volume information 74 is added to the files 76 and 78 in the order shown in FIG. 4. Thus, logic data to be recorded on the disk 10 is prepared. Error correction data is added to the logic data prepared in the volume formatter (VFMT) 226 in a disk formatter (DFMT) 228, and thus the logic data is re-converted to physical data to be recorded on the disk. In a modulator 230, the physical data prepared by the disk formatter (DFMT) 228 is converted to record data to be actually recorded on the disk. The modulated record data is recorded on the disk 10 by a recorder 232.

Figure 24:
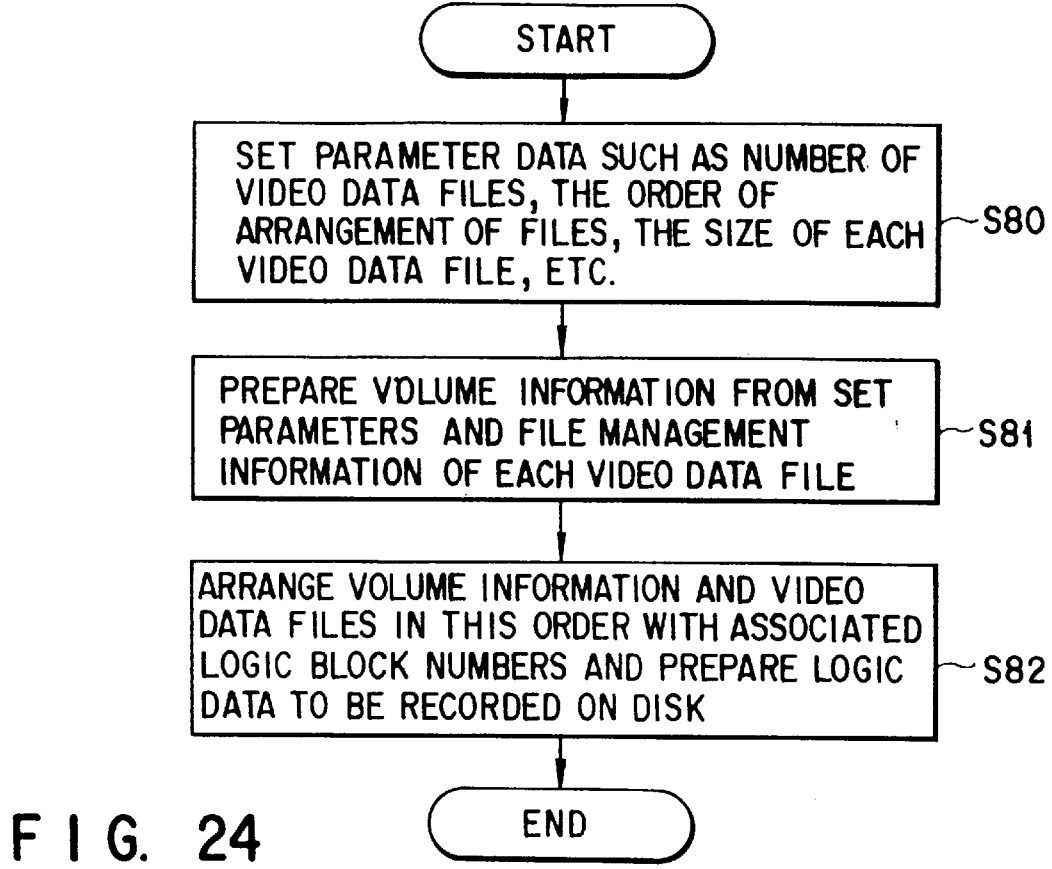
FIG. 24 is a flowchart illustrating a logic data preparing process performed by the disk formatter system shown in FIG. 23.
Figure 25:
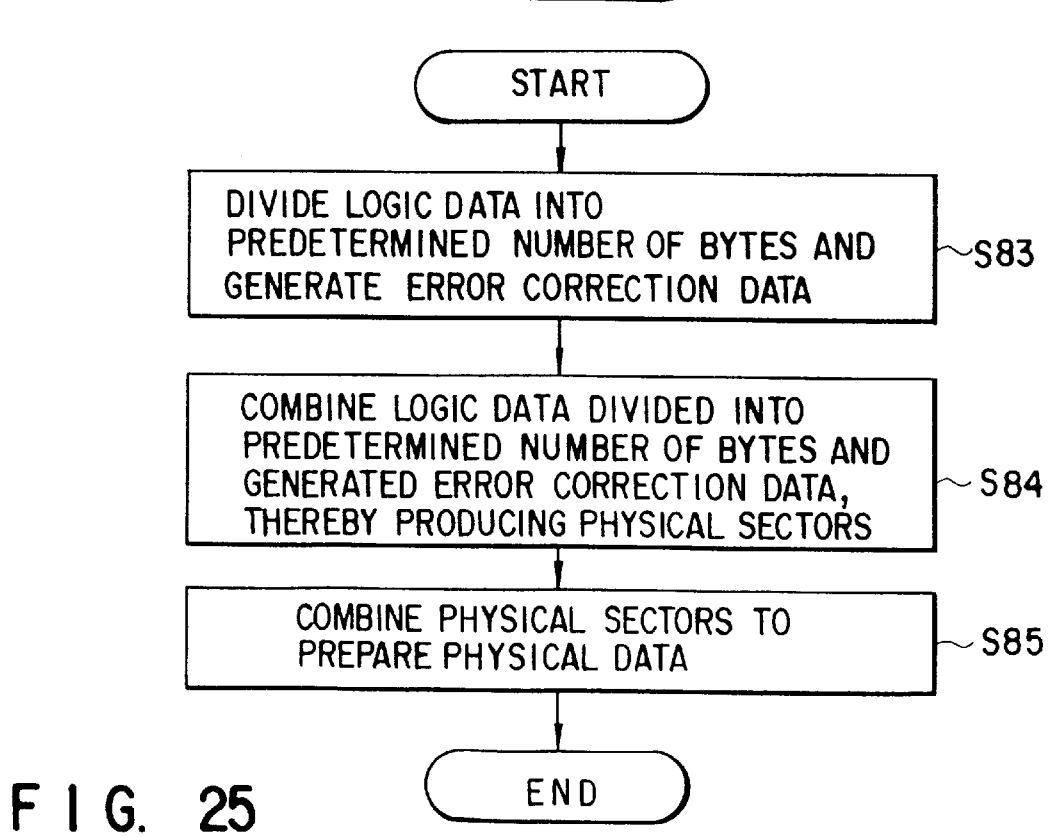
FIG. 25 is a flowchart illustrating a physical data preparing process performed by the disk formatter system shown in FIG. 23.

FIGS. 24 and 25 illustrate standard flows for preparing the above-described disk. FIG. 24 shows a flow for preparing the logic data to be recorded on the disk 10. Specifically, in step S80, parameter data such as the number of video data files, the order of arrangement of the files, the size of each video data file, etc. are set at first. In step S81, volume information is prepared from the set parameters and file management information of each video data file. Thereafter, in step S82, the volume information and video data files are arranged in this order with the associated logic block numbers. Thus, the logic data to be recorded on the disk 10 is prepared.

Subsequently, the flow shown in FIG. 25 for preparing the physical data to be recorded on the disk is executed. Specifically, in step S83, the logic data is divided into a predetermined number of bytes, and error correction data is generated. In step S84, the logic data divided into the predetermined number of bytes and the generated error correction data are combined, thereby producing physical sectors. Then, in step S85, the physical sectors are-combined to prepare the physical data.

The physical data generated by the flow of FIG. 25 is subjected to a modulating process based on predetermined rules. Thus, the recording data is prepared. Then, the record data is recorded on the disk 10.

In the above-described embodiment, a high-density recording optical disk is adopted as recording medium. The present invention, however, is applicable to recording mediums other than the optical disk, for example, a magnetic disk or other recording mediums physically capable of high-density recording.

By using commands for controlling reproduction presentation, sub-picture can be freely presented in accordance with reproduced audio data and the associated reproduction time. Furthermore, only one sub-picture data stream is needed for one audio data stream.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording medium comprising:

video data to be reproduced as a moving picture;

first audio data to be reproduced along with said video data, said first audio data being in a first language;

first and second sub-picture data which are adapted to be selectively presented along with said first audio data and that are selectively set in one of a presentation mode and a non-presentation mode, respectively, in association with said first audio data, said first sub-picture data presenting sub-picture information in said first language and said second sub-picture data presenting sub-picture information in a second language; and control information for forcibly presenting without user's intervention one of said first and said second sub-picture data in a predetermined time slot of a reproduction time sequence during which said first audio data is reproduced, even if said first and said second sub-picture data are set in said non-presentation mode so that one of said first and said second sub-picture information is presented without using additional sub-picture data associated with said first and said second language duplicating said first and said second sub-picture data.

2. The recording medium according to claim 1, wherein said control information includes first timing information for designating a time for preparing presentation of one of said first and said second sub-picture data, second timing information for designating a time for starting a presentation of one of said first and said second sub-picture data, and third timing information for designating a time for terminating said presentation of one of said first and said second sub-picture data.

3. The recording medium according to claim 1, wherein said control information is located on said recording medium such that said control information is reproduced prior to said first audio data.

4. The recording medium according to claim 1, wherein second audio data to be reproduced along with said video data is recorded on the recording medium in addition to said first audio data, and said control information includes a first field holding a command for controlling presentation of said first sub-picture data only while said first audio data is being reproduced, a second field designating which one of a start and a termination of said presentation should be controlled by said command, and a third field designating a timing for executing said command.

5. A recording method for a recording medium, comprising the steps of:

recording video data to be reproduced as a moving picture;

recording first audio data to be reproduced along with said video data, said first audio data being in a first language;

recording first and second sub-picture data which are adapted to presented along with said first audio data and which can be selectively set in one of a presentation mode and a non-presentation mode, respectively, in association with said first audio data, said first sub-picture data presenting sub-picture information in said first language and said second sub-picture data presenting sub-picture information in a second language; and recording control information for forcibly presenting without user's intervention one of said first and said second sub-picture data in a predetermined time slot of a reproduction time sequence during which said first audio data is reproduced, even if said first and said second sub-picture data are set in said non-presentation mode so that one of said first and said second sub-picture information is presented without using additional sub-picture data associated with said first and said second language duplicating said first and said second sub-picture data.

6. The recording method according to claim 5, wherein said control information includes first timing information for designating a time for preparing presentation of one of said first and said second sub-picture data, second timing information for designating a time for starting a presentation of one of said first and said second sub-picture data, and third timing information for designating a time for terminating said presentation of one of said first and said second sub-picture data.

7. The recording method according to claim 5, wherein said control information is located on said recording medium such that said control information is reproduced prior to said first audio data.

8. The recording method according to claim 5, wherein second audio data to be reproduced along with said video data is recorded on the recording medium in addition to said first audio data, and said control information includes a first field holding a command for controlling presentation of the first sub-picture data only while said first audio data is being reproduced, a second field designating which one of a start and a termination of said presentation should be controlled by the command, and a third field provided for designating a timing for executing said command.

9. A recording apparatus for recording medium, comprising:

means for recording video data to be reproduced as a moving picture;

means for recording first audio data to be reproduced along with said video data, said first audio data being in a first language;

means for recording first and second sub-picture data which can be presented along with said first audio data and which can be selectively set in one of a presentation mode and a non-presentation mode, respectively, in association with said first audio data, said first sub-picture data presenting sub-picture information in said first language, and said second sub-picture data presenting sub-picture information in a second language; and means for recording control information for forcibly presenting without user's intervention one of said first and said second sub-picture data in a predetermined time slot of a reproduction time sequence during which said first audio data is reproduced, even if said first and said second sub-picture data are set in said non-presentation mode so that one of said first and said second sub-picture information is presented without using additional sub-picture data associated with said first and said second language duplicating said first and said second sub-picture data.

10. The recording apparatus according to claim 9, wherein said control information includes first timing information for designating a time for preparing presentation of one of said first and said second sub-picture data, second timing information for designating a time for starting a presentation of one of said first and said second sub-picture data, and third timing information for designating a time for terminating said presentation of one of said first and said second sub-picture data.

11. The recording apparatus according to claim 9, wherein said control information is located on said recording medium such that said control information is reproduced prior to said first audio data.

12. The recording apparatus according to claim 9, wherein said apparatus further comprises means for recording, in addition to said first audio data, second audio data to be reproduced along with said video data, and said control information includes a first field holding a command for controlling presentation of said first sub-picture data only while said first audio data is being reproduced, a second field designating which one of a start and a termination of said presentation should be controlled by said command, and a third field provided for designating a time for executing said command.

13. A reproducing apparatus for a recording medium which comprises video data to be reproduced as a moving picture, first audio data to be reproduced along with said video data, said first audio data being in a first language, first and second sub-picture data which can be presented along with said first audio data and can be selectively set in one of a presentation mode and a non-presentation mode, respectively, in association with said first audio data, said first sub-picture data presenting sub-picture information in said first language and said second sub-picture data presenting sub-picture information in a second language, and control information concerning presentation of said first and said second sub-picture information, comprising:

reproducing means for reproducing said video data, said first audio data and one of said first and said second sub-picture data from said recording medium;

selection means for selecting one of said presentation mode and said non-presentation mode of one of said first and said second sub-picture data; and control means for forcibly presenting without user's intervention one of said first and said second sub-picture data in a predetermined time slot of a reproduction time sequence during which said first audio data is reproduced, even if said first and said second sub-picture data are set in said non-presentation mode by said selection means so that one of said first and said second sub-picture information is presented without using additional first and second sub-picture data associated with said first and said second language duplicating said first and said sub-picture data.

14. The reproducing apparatus according to claim 13, wherein said control information includes first timing information for designating a time for preparing presentation of one of said first and said second sub-picture data, second timing information for designating a time for starting a presentation of one of said first and said second sub-picture data, and third timing information for designating a time for terminating said presentation of one of said first and said second sub-picture data, said control means includes means for controlling said reproducing means based on said first, second and third timing information.

15. The reproducing apparatus according to claim 13, wherein said control information is located on said recording medium such that said control information is reproduced prior to said first audio data.

16. The reproducing apparatus according to claim 13, wherein second audio data to be reproduced along with said video data is recorded in addition to said first audio data, and said control information includes a first field holding a command for controlling presentation of said first sub-picture data only while said first audio data is being reproduced, a second field provided for designating which one of a start and a termination of said presentation should be controlled by said command, and a third field provided for designating a timing of executing said command.

17. A reproducing method for a recording medium which comprises video data to be reproduced as a moving picture, first audio data to be reproduced along with said video data, said first audio data being in a first language, first and second sub-picture data which can be presented along with said first audio data and can be selectively set in one of a presentation mode and a non-presentation mode, respectively, in association with said first audio data, said first sub-picture data presenting sub-picture information in said first language and said second sub-picture data presenting sub-picture information in a second language, and control information concerning presentation of said first and said second sub-picture information, comprising:

a reproducing step of reproducing said video data, said first audio data and one of said first and said second sub-picture data from said recording medium;

a selecting step of selecting one of said presentation mode and said non-presentation mode of said first and said second sub-picture data; and a control step of forcibly presenting without user's intervention one of said first and said second sub-picture data in a predetermined time slot of a reproduction time sequence during which said first audio data is reproduced, even if said first and said second sub-picture data are set in said non-presentation mode so that one of said first and said second sub-picture information is presented without using additional first and second sub-picture data associated with said first and said second language duplicating said first and said second sub-picture data.

18. The reproducing method according to claim 17, wherein said control information includes first timing information for designating a time for preparing presentation of one of said first and said second sub-picture data, second timing information for designating a time for starting a presentation of one of said first and said second sub-picture data, and third timing information for designating a time for terminating the presentation of one of said first and said second sub-picture data, said control step includes means for controlling said reproducing step based on said first, second and third timing information.

19. The reproducing method according to claim 17, wherein said control information is located on said recording medium such that said control information is reproduced prior to said first audio data.

20. The reproducing method according to claim 17, wherein second audio data to be reproduced along with said video data is recorded in addition to said first audio data, and said control information includes a first field holding a command for controlling presentation of said first sub-picture data only while said first audio data is being reproduced, a second field provided for designating which on of a start and a termination of said presentation should be controlled by said command, and a third field provided for designating a timing of executing said command.

* * * * *